US008364556B2

(12) United States Patent  
Nguyen et al.

(10) Patent No.: US 8,364,556 B2
(45) Date of Patent: Jan. 29, 2013

(54) METHOD AND SYSTEM TO AUTOMATE PAYMENT FOR A COMMERCE TRANSACTION

(75) Inventors: Ngan-Ha D. Nguyen, Belmont, CA (US); Jeffrey A. Herman, Palo Alto, CA (US); Renée Gentry, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/411,006

(22) Filed: Mar. 2, 2012

(65) Prior Publication Data

US 2012/0166340 A1 Jun. 28, 2012

Related U.S. Application Data

(62) Division of application No. 10/427,553, filed on Apr. 30, 2003, now Pat. No. 8,160,933.

(51) Int. Cl.
*G06Q 30/00* (2006.01)
(52) U.S. Cl. .................. 705/26.35; 705/26.1; 705/26.41; 705/26.3; 705/75
(58) Field of Classification Search ........ 705/26.1–26.9, 705/27.1, 27.2, 75
See application file for complete search history.

(56) References Cited

U.S. PATENT DOCUMENTS

| 4,799,156 A | 1/1989 | Shavit et al. |
| 5,056,019 A | 10/1991 | Schultz et al. |
| 5,671,364 A | 9/1997 | Turk |
| 5,778,178 A | 7/1998 | Arunachalum |
| 5,794,210 A | 8/1998 | Goldhaber et al. |
| 5,845,265 A | 12/1998 | Woolston |
| 5,966,698 A * | 10/1999 | Pollin ........................... 705/34 |
| 5,983,207 A | 11/1999 | Turk et al. |
| 5,987,500 A | 11/1999 | Arunachalam |
| 6,012,045 A * | 1/2000 | Barzilai et al. ................. 705/37 |
| 6,029,150 A | 2/2000 | Kravitz |
| 6,058,379 A | 5/2000 | Odom et al. |
| 6,212,556 B1 | 4/2001 | Arunachalam |
| 6,246,996 B1 | 6/2001 | Stein et al. |
| 6,260,024 B1 | 7/2001 | Shkedy |
| 6,266,652 B1 | 7/2001 | Godin et al. |
| 6,415,270 B1 | 7/2002 | Rackson et al. |
| 6,594,640 B1 | 7/2003 | Postrel |
| 6,629,082 B1 | 9/2003 | Hambrecht et al. |

(Continued)

FOREIGN PATENT DOCUMENTS

| WO | WO-0104816 A1 | 1/2001 |
| WO | WO-0129750 A1 | 4/2001 |

(Continued)

OTHER PUBLICATIONS

"Amazon.com: Use Amazon.com Payments", [Online]. Retrieved from the Internet: <URL:http://web.archive.org/web/200001018012733/http://s1.amazon.com/exec/varzea/selling/payments-start.html>. (Archived Oct. 18, 2000), 3 pgs.

(Continued)

*Primary Examiner* — Ramsey Refai
(74) *Attorney, Agent, or Firm* — Schwegman Lundberg & Woessner, P.A.

(57) ABSTRACT

A method and system to automate payment for a network-based commerce transaction provide a buyer an option to enable an automatic payment service, wherein automatic payment service automatically provides payment to a seller upon a termination event of a network-based commerce transaction. Payment information of the buyer is provided to a network-based payment system upon the occurrence of the termination event.

29 Claims, 19 Drawing Sheets

U.S. PATENT DOCUMENTS

| | | | |
|---|---|---|---|
| 6,839,692 B2 | 1/2005 | Carrott et al. | |
| 6,965,878 B1 | 11/2005 | Heuring | |
| 6,970,838 B1 | 11/2005 | Kamath et al. | |
| 7,003,485 B1 | 2/2006 | Young | |
| 7,031,939 B1 | 4/2006 | Gallagher et al. | |
| 7,089,208 B1 * | 8/2006 | Levchin et al. | 705/39 |
| 7,110,978 B1 * | 9/2006 | Chin | 705/39 |
| 7,177,836 B1 | 2/2007 | German et al. | |
| 7,191,151 B1 * | 3/2007 | Nosek | 705/39 |
| 7,249,055 B1 | 7/2007 | Elder | |
| 7,330,826 B1 | 2/2008 | Porat et al. | |
| 7,343,339 B2 | 3/2008 | Harrison, Jr. et al. | |
| 7,356,507 B2 * | 4/2008 | Bezos et al. | 705/40 |
| 7,376,587 B1 | 5/2008 | Neofytides et al. | |
| 7,461,022 B1 | 12/2008 | Churchill et al. | |
| 7,483,856 B2 | 1/2009 | Likourezos et al. | |
| 7,499,875 B1 * | 3/2009 | May et al. | 705/26.3 |
| 7,512,563 B2 | 3/2009 | Likourezos et al. | |
| 7,536,351 B2 | 5/2009 | Leblang et al. | |
| 7,567,937 B2 | 7/2009 | Likourezos et al. | |
| 7,593,898 B1 | 9/2009 | Tsuei et al. | |
| 7,599,881 B2 | 10/2009 | Likourezos et al. | |
| 7,610,244 B2 | 10/2009 | Likourezos et al. | |
| 7,627,528 B2 | 12/2009 | Likourezos et al. | |
| 7,720,743 B1 | 5/2010 | Marks | |
| 7,756,785 B2 | 7/2010 | Gebb et al. | |
| 7,761,385 B2 | 7/2010 | Hutchison et al. | |
| 7,827,086 B1 | 11/2010 | Ellenberg et al. | |
| 8,160,933 B2 * | 4/2012 | Nguyen et al. | 705/26.35 |
| 2001/0009005 A1 | 7/2001 | Godin et al. | |
| 2001/0039524 A1 | 11/2001 | Harrison, Jr. et al. | |
| 2001/0049634 A1 | 12/2001 | Stewart | |
| 2001/0049647 A1 | 12/2001 | Sheehan | |
| 2002/0026396 A1 | 2/2002 | Dent et al. | |
| 2002/0029339 A1 | 3/2002 | Rowe | |
| 2002/0062257 A1 | 5/2002 | Minamishin et al. | |
| 2002/0087461 A1 | 7/2002 | Ganesan et al. | |
| 2002/0095372 A1 | 7/2002 | Likourezos et al. | |
| 2002/0095376 A1 | 7/2002 | Likourezos et al. | |
| 2002/0095377 A1 | 7/2002 | Likourezos et al. | |
| 2002/0095379 A1 | 7/2002 | Likourezos et al. | |
| 2002/0103711 A1 | 8/2002 | Karas et al. | |
| 2002/0165764 A1 | 11/2002 | Wade et al. | |
| 2003/0093355 A1 | 5/2003 | Issa | |
| 2004/0225606 A1 | 11/2004 | Nguyen et al. | |
| 2005/0149394 A1 | 7/2005 | Postrel | |
| 2007/0005432 A1 * | 1/2007 | Likourezos et al. | 705/14 |
| 2007/0118476 A1 | 5/2007 | Likourezos et al. | |

FOREIGN PATENT DOCUMENTS

| | | |
|---|---|---|
| WO | WO-0205231 A2 | 1/2002 |
| WO | WO-2004099939 A2 | 11/2004 |
| WO | WO-2004099939 A3 | 11/2004 |

OTHER PUBLICATIONS

"Andale: Get Paid Faster", [Online]. Retrieved from the Internet: <URL: http://web.archive.org/web/20000303162422/http://www.andale.com/corp/tour5.html>, (Archived Mar. 3, 2000), 2 pgs.

"Andale: Shipping and Payment Tools", [Online]. Retrieved from the Internet: <URL: http://web.archive.org/web/200011210752/http://andale.com/corp/auction/shippay.html>, (Archived Nov. 21, 2000), 2 pgs.

"Andale: Shipping and Payment Tools", [Online]. Retrieved from the Internet: <URL: http://web.archive.org/web/200012140816/http://www.andale.com/corp/auction/shippay.html>, (Archived Dec. 14, 2000), 2 pgs.

"U.S. Appl. No. 10/427,553, Final Office Action mailed Jan. 27, 2009", 11 pgs.

"U.S. Appl. No. 10/427,553, Final Office Action mailed Apr. 28, 2011", 7 pgs.

"U.S. Appl. No. 10/427,553, Non Final Office Action mailed Sep. 10, 2009", 10 pgs.

"U.S. Appl. No. 10/427,553, Non-Final Office Action mailed May 5, 2010", 11 pgs.

"U.S. Appl. No. 10/427,553, Non-Final Office Action mailed Jul. 28, 2008", 19 pgs.

"U.S. Appl. No. 10/427,553, Notice of Allowance mailed Feb. 27, 2012", 7 pgs.

"U.S. Appl. No. 10/427,553, Preliminary Amendment Filed Jan. 12, 2012", 12 pgs.

"U.S. Appl. No. 10/427,553, Preliminary Amendment filed Apr. 1, 2005", 16 pgs.

"U.S. Appl. No. 10/427,553, Response filed Feb. 10, 2010 to Non Final Office Action mailed Sep. 10, 2009", 16 pgs.

"U.S. Appl. No. 10/427,553, Response filed Apr. 27, 2009 to Final Office Action mailed Sep. 27, 2009", 18 pgs.

"U.S. Appl. No. 10/427,553, Response filed Jul. 1, 2008 to Restriction Requirement mailed Jun. 20, 2008", 13 pgs.

"U.S. Appl. No. 10/427,553, Response filed Oct. 27, 2010 to Non Final Office Action mailed May 5, 2010", 25 pgs.

"U.S. Appl. No. 10/427,553 Response filed Oct. 28, 2008 to Non-Final Office Action mailed Jul. 28, 2008", 19 pgs.

"U.S. Appl. No. 10/427,553, Response filed Aug. 26, 2011 to Final Office Action mailed Apr. 28, 2011", 15 pgs.

"U.S. Appl. No. 10/427,553, Restriction Requirement mailed Jun. 20, 2008", 6 pgs.

Auction Club—Welcome![Online]. Retrieved from the Internet: <http://classic-web.archive.org/web/19991023094230/www.auctionclub.com/welcome/html>, (Archived Oct. 23, 1999), 1 pg.

"AuctionBytes—Update No. 8", [Online]. Retrieved from the Internet: <http://www.auctionbytes.com/Email_Newsletter/8/8.html>, (Feb. 19, 2000), 17 pgs.

"AuctionWatch Profile: Yahoo! PayDirect", [Online]. Retrieved from the Internet: <URL: http://web.archive.org/web/200101232136/http://www.auctionwatch.com/awdaily/reviews/profiles/paydirect2.html>, (Archived Jan. 23, 2001), 3 pgs.

"AuctionWeb Billing Information", [Online]. Retrieved from the Internet: <http://web.archive.org/web/19981206125104/http://www2ebay.com/aw/billing.html>, (Archived Dec. 6, 1998), 2 pgs.

"AuctionWorks: About Us", [Online]. Retrieved from the Internet: <URL: http://web.archive.org/web/200011090239/http://auctionworks.com/about.asp , (Archived Nov. 9, 2000), 2 pgs.

"AuctionWorks: Features and Benefits", [Online], Retrieved from the Internet: <URL: http://web.archive.org/web/200012060409/http://www.auctionworks.com/features.asp>, (Archived Dec. 6, 2000), 3 pgs.

"AuctionWorks; Fees", [Online]. Retrieved from the Internet: <URL: http://web.archive.org/web/20001019035406/http://www.auctionworks.com/pricing.asp>, (Archived Oct. 19, 2000), 2 pgs.

"AuctionWorks: News: Headlines: Mar. 2000", [Online]. Retrieved from the Internet: <URL: http://web.archive.org/web/20000818085457/http://wvvw.auctionworks.com/news_mar2000.asp>, (Archived Aug. 18, 2000), 12 pgs.

"AuctionWorks: Power Tools for Power Sellers", [Online]. Retrieved from the Internet: <URL: http://web.archive.org/web/200012021555/http://auctionworks.com/default.asp>, (Archived Dec. 2, 2000), 1 pg.

"Barter Firms Hope to Profit From Online Swapping", Forbes, [Online]. Retrieved from the Internet: <http://www.forbes.com/2000/06107/smallbus_feat_pring.html>, (2000), 2 pgs.

"Best Internet Announces Support for CyberCoin Electronic Commerce Micropayment System; New Product Offers Low-Cost, High-Value Products Using Fast, Convenient Payment System", [Online]. Retrieved from the Internet: <URL: http://findarticles.com/p/articles/mi_m0EIN/is_1996_Nov_20/ai_18872841/>, (Nov. 20, 1996), 4 pgs.

"BidPay: Buyer Frequently Asked Questions", [Online]. Retrieved from the Internet: <http://web.archive.org/web/200011180211/http://www.bidpay.com/faq.htm>, (Archived Nov. 18, 2000), 3 pgs.

"BidPay: Frequent-Buyer Contest", [Online]. Retrieved from the Internet: <http://web.archive.org/web/20000510162257/http://www.bidpay.com/BuyerContest.htm>, (Archived May 10, 2000), 1 pg.

"BidPay: Seller Frequently Asked Questions", [Online]. Retrieved from the Internet: <http://web.archive.org/web/200011171802/http://www.bidpay.com/SellerFaq.htm>, (Archived Nov. 17, 2000), 5 pgs.

"BidPay: Why use this service?", [Online]. Retrieved from the Internet: <URL:http://classic-web.archive.org/web/20000302021905/http://www.bidpay.com/whyshould.htm>, (Archived Mar. 2, 2000), 1 pg.

"Bigvine Announces the Winner of the Bigvine Dream Office Sweepstakes", PR Newswire, [Online]. Retrieved from the Internet: <http://www.thefreelibrary.com/Bigvine+Announces+Winner+of+the+Bigvine+Dream+Office+Sweepstakes.-a064787266>, (Aug. 30, 2000), 3 pgs.

"Bigvine: Welcome to Internet Barter", [Online]. Retrieved from the Internet: <http://web.archive.org/web/200001019092659/http://bigvine.com/index.jsp>, (Archived Jan. 1, 2000), 1 pg.

"Billpoint, the eBay Payment Service, Begins Launch Today", [Online]. Retrieved from the Internet: <http://web.archive.org/web/20000609055506/http://www.billpoint.com/about_bp/bplaunch.html>, (Archived Jun. 9, 2005), 2 pgs.

"Billpoint: Fees", [Online]. Retrieved from the Internet: <http://classic-web.archive.org/web/20001202846/http://pages.ebay.com/help/sellerguide/bp-fees.html>, (Archived Dec. 2, 2000), 3 pgs.

"CashRegister 3 Service: Detailed Information and Benefits", [Online]. Retrieved from the Internet: <http://web.archive.org/web/20000619125023/http://www.cybercash.com/cybercash/services/crdetails.html>, (Archived Jun. 19, 2000), 2 pgs.

"CheckFree: Homepage", [Online]. Retrieved from the Internet: <URL: http://web.archive.org/web/200011100555/http:/checkfree.com>, (Archived Nov. 10, 2000), 1 pg.

"CheckFree: Join the Millions of Other Who are Check Free", [Online]. Retrieved from the Internet: <URL: http://web.archive.org/web/200012051939/http:/wmv.checkfree.comiebpidetail/1,5857,26,00 .html>, (Archived Dec. 5, 2000), 2 pgs.

"CheckFree: You're in Control Now", [Online]. Retrieved from the Internet: <URL: http://web.archive.org/web/200011191730/http://www:checkfree.com/productsandservices/0,5866,82,00.htm>, (Archived Nov. 19, 2000), 5 pgs.

"Citigroup launches person-to-person payment system, partners with AOL for marketing", LexisNexis: The Associated Press, (Accessed Nov. 1, 2000), 1 pg.

"CyberCash Merchant List", [Online]. Retrieved from the Internet: <http://web.archive.org/web/19990221032720/http://www.cybercash.com/cybercash/consumers/goshop.html>, (Archived Feb. 21, 1999), 11 pgs.

"CyberCash: A Part of the History of Online Payments", [Online]. Retrieved from the Internet: <http://www.morebusiness.com/getting_started/websiteld912805488.brc>, (Jan. 13, 1999), 2 pgs.

"CyberCoin FAQ", [Online]. Retrieved from the Internet: <http://web.archive.org/web/19970211105332/http://www.cybercash.com/cybercash/shoppers/coinfaq.html>, (Archived Feb. 11, 1997), 6 pgs.

"CyberSource(r) Powers Industry's First Email Payment Service, PayPal", [Online]. Retrieved from the Internet: <URL: http://web.archive.org/web/20000510032534/http://www.x.com/news_cybersource.htm>, (Archived May 10, 2000), 2 pgs.

"eBay Account Status", [Online]. Retrieved from the Internet: <URL: http://web.archive.org/web/19991013014238/http://pages.ebay.com/services/buyandsell/account-status.html>, (Archived Oct. 13, 1999), 1 pgs.

"eBay and AuctionWorks Sign Licensing Agreement", Business Wire, [Online], Retrieved from the Internet: <URL: http://www.thefreelibrary.com/eBay+and+AuctionWorks+Sign+Licensing+Agreement.-a060951364>, (Mar. 30, 2000), 2 pgs.

"eBay and Visa Announce Person-to-Person Payment Partnership", [Online]. Retrieved from the Internet: <http://web.archive.org/web/20000708183648/http://billpoint.com/about_bp/news-visa.html>, (Archived Jul. 8, 2000), 2 pgs.

"eBay Buyer's Guide: Visa Incentive", [Online]. Retrieved from the Internet: <URL: http://web.archive.org/web/20000510180706/http://pages.ebay.com/help/buyerguide/bp-visa.html>, (Archived May 10, 2000), 2 pgs.

"eBay: Buyer Information", [Online]. Retrieved from the Internet: <URL: http://web.archive.org/web/200101240529/http://pages.ebay.com/services/buyandsell/buyitnow-buyerhtml>, (Archived Jan. 24, 2001), 2 pgs.

"eBay: Frequently Asked Questions on new seller requirements", [Online]. Retrieved from the Internet: <URL: http://web.archive.org/web/19991129053804/http://pages.ebay.com/help/basics/fccupdate.html>, (Archived Nov. 29, 1999), 4 pgs.

"eBay: Learn about Buy It Now", [Online]. Retrieved from the Internet: <URL: http://web.archive.org/web/200012050700//http:/pages.ebay.com/services.buyandsell/buyitnow.html>, (Archived Dec. 5, 2000), 2 pgs.

"eBay: Press Releases (May 1999)", [Online]. Retrieved from the Internet: <URL: http://web.archive.org/web/200012030949/http://pages.ebay.com/aboutebay/releases/9905.html>, (Archived Dec. 3, 2000), 8 pgs.

"eBay: Press Releases (Sep. 1999)", [Online]. Retrieved from the Internet: <URL: http://web.archive.org/web/200012031355/http://pages.ebay.com/aboutebay/releases/9909.html>, (Archived Dec. 3, 2000), 5 pgs.

"eBay: Seller Information". [Online]. Retrieved from the Internet: <URL: http://web.archive.org/web/200011091505/http://pages.ebay.com/services/buyandsell/buyitnow-seller.html>, (Archived Nov. 9, 2000), 2 pgs.

"eBay: Seller's Guide—Fees", [Online]. Retrieved from the Internet: <URL: http://web.archive.org/web/20000301100021/http://pages.ebay.com/help/sellerguide/selling-fees.html>, (Archived Mar. 1, 2000), 6 pgs.

"Epinions: PayPal explained", [Online]. Retrieved from the Internet: <http://www.epinions.com/review/finc-Financial_Services-Online-Bills-PayPal/finc-review-70D9-334CD902-3A09939E-prod6>, (Nov. 8, 2000), 4 pgs.

"eWanted: Billing/Payment Terms", [Online]. Retrieved from the Internet: <URL: http://web.archive.org/web/200012120939/http://www.ewanted.com/billing/payment.cfm>, (Archived Dec. 12, 2000), 3 pgs.

"eWanted: Fraud Protection Program", [Online]. Retrieved from the Internet: <URL: http://web.archive.org/web/200012101341/http://www.ewanted.com/frs/default.cfm>, (Archived Dec. 10, 2000), 2 pgs.

"Gold's Auction Billing", [Online]. Retrieved from the Internet: <http:replay.waybackmachine.org/20000119135639/http://goldsauction.com/html/auction>, (Jan. 19, 2000), 1 page.

"Gold's Auction Privacy Policy", [Online]. Retrieved from the Internet: <http://replay.waybackmachine.org/20000305125201/http://goldsauction.com>, (Mar. 15, 2000), 5 pages.

"Gold's Auction Sellers FAQ(Frequently Asked Questions)", [Online]. Retrieved from the Internet: <http://replay.waybackmachine.ord/19991013094816/http://goldsauction.com/html/sellerFAQ>, (Oct. 13, 1999), 8 pages.

"Gold's Auction User Agreement". [Online]. Retrieved from the Internet: <http://replay.waybackmachine.org/1999101354400/http://goldsauction.com/html/agreement>, (Oct. 13, 1999), 4 pages.

"GoldMoney: Frequently Asked Questions about GoldMoney", [Online]. Retrieved from the Internet: <URL: http://web.archive.org/web/20000929000743/http://wvvw.goldmoney.com/faq/>, (Archived Sep. 29, 2000), 6 pgs.

"GoldMoney: Welcome to GoldMoney.com", [Online]. Retrieved from the Internet: <URL: http://web.archive.org/web/20000613033911/http://www.goldmoney.com/home/?>, (Archived Jun. 13, 2000), 1 pgs.

"Infinia: Advantages", [Online]. Retrieved from the Internet: <URL: http://web.archive.org/web/200012021616/http://www.infinia.com/bill.asp>, (Archived Dec. 2, 2000), 1 pg.

"Infinia: How it works", [Online]. Retrieved from the Internet; <URL: http://web.archive.org/web/200012021849/http://www.infinia.com/start.asp , (Archived Dec. 2, 2000), 1 pg.

"International Application U.S. Appl. No. PCT/US04/14386, International Search Report and Written Opinion mailed Jan. 12, 2005", 8 pgs.

"International Application Serial No. PCT/US2004/014386, International Preliminary Examination Report mailed May 20, 2005", 15 pgs.

"International Search Report and Written Opinion, for Application No. PCT/US2004/14386, date mailed Jan. 12, 2005", 10 Pages.

"LassoBucks: Faq;", [Online]. Retrieved from the Internet: <http://web.archive.org/web/20000127054029/http://lassobucks.com/index.cfm?fuseaction=faq>, (Archived Jan. 27, 2000), 5 pgs.

"LassoBucks: Fees and Taxes", [Online]. Retrieved from the Internet: <http://web.archive.org/web/2000605004526/http://www.lassobucks.com/info/index.cfm?fusearctionxfee>, (Archived Jun. 5, 2000), 2 pgs.

"New Western Union Internet Service Mean E-Mailing Money Is Only a Click Away; One of the Most Trusted Money Transfer Brands Has Moved to the Internet", LexisNexis: PR Newswire, (Sep. 7, 2000), 2 pgs.

"New! Instant Purchase from Billpoint", Billpoint, [Online]. Retrieved from the Internet: <http://web.archive.org/web/20000815052729/http://www.billpoint.com/about_bp/news-ip.com>, (Archived Aug. 15, 2000), 1 pg.

"Niphix Trading System", [Online]. Retrieved from the Internet: <http://web.archive.org/web/19990422091641/http:www.niphix.com/trading.htm>, (Archived Apr. 22, 1999), 2 pgs.

"Niphix Trading System Overview", [Online]. Retrieved from the Internet: <http://web.archive.org/web/20010420104520fw_/http://niphox.com/handbookmain.htm>, (Archived Apr. 20, 2001), 2 pgs.

"Niphix.com: Overview", [Online]. Retrieved from the Internet: <URL: http://web.archive.org/web/20000615135140/http://niphix.comihandbook.htm>, (Archived Jun. 15, 2000), 1 pg.

"Niphix: Demo Trading", [Online], Retrieved from the Internet: <http://web/archive.org/web/19990422021323/http://www.niphix.com/demotrading.htm>, (Archived Apr. 22, 1999), 2 pgs.

"PayPal Auction Tools", [Online]. Retrieved from the Internet: <http://web.archive.org/web/200012040404/http://www.paypal.com/cgi-bin/webscr?cmd=p/auc/index-outside>, (Archived Dec. 4, 2000), 1 pg.

"PayPal Leads the way in e-commerce's digital cash movement", The Journal Record, [Online]. Retrieved from the Internet: <http://findarticles.com/p/articles/mi_qn4182/is_20001030/ai_n10142156/>, (Oct. 30, 2000), 6 pgs.

"PayPal Will Double eBay's Anti-Fraud Insurance", [Online]. Retrieved from the Internet: <https://www.paypalobjects.com/html/pr-110300.html>, (Nov. 3, 2000), 1 pg.

"PayPal: Help", [Online]. Retrieved from the Internet: <http://web.archive.org/web/20000510134829/http://www.paypal.com/cgi-bin/webscr?cmd=home/help>, (Archived May 10, 2000), 8 pgs.

"PayPal: How it Works", [Online]. Retrieved from the Internet: <http://web.archive.org/web/20000510055124/http://www.paypal.com/cgi-bin/webscr?cmd=home/works>, (May 10, 2000), 1 pg.

"PayPal: Instant Purchase—Please Explain!", [Online]. Retrieved from the Internet: <http://www.vendio.com/mesg/read.html?num=2&thread=187479>, (Oct. 25, 2000), 1 pg.

"PayPal: Instant Purchases for Auctions", [Online]. Retrieved from the Internet: <http://web.archive.org/web/20010330080752/http://www.paypal.com/cgi-bin/webscr?cmd=p/gen/auction-footer-outside>, (Archived Mar. 30, 2001), 1 pg.

"PayPal: Personal Account or Business Account", [Online]. Retrieved from the Internet: <http://web.archive.org/web/20000711054503/http://www.paypal.com/cgi-bin/webscr?cmd=p/gen/personal_vs_business-outside>, (Archived Jul. 11, 2000), 2 pgs.

"Rocket Cash: Answers to Frequently Asked Questions by Merchants", [Online]. Retrieved from the Internet: <URL: http://web.archive.org/web/20000309065811/http://rocketcash.com/rc/merchantsFAQs.htm> , (Archived Mar. 9, 2000), 5 pgs.

"Rocket Cash: Frequently Asked Questions", [Online]. Retrieved from the Internet: <URL: http://web.archive.org/web/20000325032302/http://www.rocketcash.com/rc/learn_more/faq_parent.html>, (Archived Mar. 25, 2000), 9 pgs.

"Rocket Cash: Frequently Asked Questions", [Online]. Retrieved from the Internet: <URL: http://web.archive.org/web/2000061216059/http://www.rocketcash.com/rc/learn_more/faq_teen.html>, (Archived Jun. 12, 2000), 10 pgs.

"Rocket Cash: Learn More", [Online]. Retrieved from the Internet: <URL: http://web.archive.org/web/20000306132648/http://www.rocketcash.com/rc/learn_more/learn_more.html>, (Archived Mar. 6, 2000), 2 pgs.

"Rocket Cash: Terms", [Online]. Retrieved from the Internet: <URL: http://web.archive.org/web/20000301101145/http://www.rocketcash.com/rc/mission_control/terms_body.html>, (Archived Mar. 1, 2000), 5 pgs.

"The Grinch: Get Ready for a Who-rrific Holiday. Season", eBay, [Online] Retrieved from the Internet: <http://web.archive.org/web/200012012321/http://www.bilipoint.com/promotion/grinchsweepstakes.html>, (Archived Dec. 1, 2000), 1 pg.

"Web Review: BigVine: A Cashless Exchange", MarketWatch, [Online]. Retrieved from the Internet: <URL: http://www.marketwatch.com/Story/story/print?guid=3D967128-3287-41DA-B084-440EE807DCCF>, (Feb. 23, 2000), 4 pgs.

"Welcome to PayPal", [Online]. Retrieved from the Internet: <URL: http://web/archive.org/web/20000606161253/http://www.paypal.com/cgi-bin/webscr?cmd>, (Archived Jun. 6, 2000), 1 pg.

"Western Union MoneyZap Signs Agreement with Homestead.com; Homestead Members Can Now Make Quick and Easy Person-to-Person Money Transfers", LexinNexis: PR Newswire, (Dec. 21, 2000), 2 pgs.

"Western Union MoneyZap Signs Agreement With MyFamily.com; MyFamily.com Members can Now Make Quick and Easy Person-to-Person Money Transfers", LexisNexis: PR Newswire, (Dec. 1, 2000), 2 pgs.

"Western Union Releases Enhances Version of Its MoneyZap Service for Person-to-Person Online Payments; New Stored-Value and Management Features Make Online Payments Easier and Faster", LexisNexis: PR Newswire, (Dec. 18, 2000), 3 pgs.

"X.com and Barclays Establish Mutual Funds Partnership", [Online]. Retrieved from the Internet: <URL: http://web.archive.org/web/20000229230435/http://x.com/news_.barclays.htm>, (Archived Feb. 29, 2000), 2 pgs.

"X.com Auction Payments", [Online]. Retrieved from the Internet: <URL: http://web.archive.org/web/20000609175219/http://www.x.com/auction_benefits.htm>, (Archived Jun. 9, 2000), 1 pgs.

"X.com Auction Payments—Your money is immediately accessible", [Online]. Retrieved from the Internet: <URL: http://web.archive.org/web/20000303055211/http://www.x.com/auction_link.htm>, (Archived Mar. 3, 2000), 1 pg.

"X.com Auction Payments: What are the advantages?", [Online]. Retrieved from the Internet: <URL: http://web.archive.org/web/20000301212747/http://x.com/auction_payments.htm>, 'Archived Mar. 1, 2000), 1 pgs.

"X.com Chosen By Auction Sites to Boost E-Commerce", [Online]. Retrieved from the Internet: <URL: http://web.archive.org/web/20000604012535/http://www.x.com/news_auctions.htm>, (Archived Jun. 4, 2000), 2 pgs.

"X.com: Banking services", [Online], Retrieved from the Internet: <URL: http://web.archive.org/web/20000229235059/http://www.x.com/tour2b.htm>, (Archived Feb. 29, 2000), 2 pgs.

"X.com: Easy Ways to Move Money—Fast, Easy, & Free", [Online]. Retrieved from the Internet: <URL: http://web.archive.org/web/20000301034013/http://www.x.com/tour2d.htm>, (Archived Mar. 1, 2000), 1 pg.

"X.com: How do I use X?", [Online]. Retrieved from the Internet: <URL: http://web.archive.org/web/20000229151005/http://www.x.com/tour1b.htm>, (Archived Feb. 29, 2000), 1 pg.

"X.com: Is my money safe?", [Online]. Retrieved from the Internet: <URL:http://web.archive.org/web/20000229171454/http://www.x.com/tour1c.htm>, (Archived Feb. 29, 2000), 1 pg.

"X.com: Main Page", [Online]. Retrieved from the Internet: <URL: http://web.archive.org/web/20000301045908/http://x.com/>, (Archived Mar. 1, 2000), 2 pgs.

"X.com: No- & low-cost mutual funds", [Online]. Retrieved from the Internet: <URL: http://web.archive.org/web/20000302061354/http://x.com/tour2c.htm>, (Archived Mar. 2, 2000), 2 pgs.

"X.com: Products and Services", [Online]. Retrieved from the Internet: <URL: http://web.archive.org/web/20000229202935/http://www.x.com/tour2a.htm>, (Archived Feb. 29, 2000), 2 pgs.

"X.com: Who are we?", [Online]. Retrieved from the Internet: <URL: http://web.archive.org/web/20000229121830/http://www.x.com/tour1a.htm>, (Archived Feb. 29, 2000), 1 pg.

"X.com: X.com for Auctions", [Online]. Retrieved from the Internet: <URL: http://web.archive.org/web/20000302070130/http://www.x.com/auction_posting.htm>, (Archived Mar. 2, 2000), 1 pg.

"X.com: X.com makes internet payment instant, secure and free", [Online]. Retrieved from the Internet: <URL: http://web.archive.org/web/20000301104957/http://www.x.com/news_payments.htm>, (Archived Mar. 1, 2000), 2 pgs.

"X.com: X.com Offers Online Account Access on Yahoo", [Online]. Retrieved from the Internet: <URL: http://web.archive.org/web/20000510084831/http://www.x.com/news_yahoo.htm>, (Archived May 10, 2000), 3 pgs.

"Yahoo opens wallet for online payment service", CNET News, [Online]. Retrieved from the Internet: <URL: http://web.archive.org/web/20050414084910/http://news.com.com/2100-1017-238322.html>, (Archived Apr. 14, 2005), 4 pgs.

"Yahoo! Auctions—Item Page: 1991 Explorer Eddie Bauer No Reserve: Bid History", [Online]. Retrieved from the Internet: <http://web.archive.org/web/200012030838/http://page.auctions.yahoo.com/auction/43742589>, (Archived Dec. 5, 2000), 3 pgs.

"Yahoo! Auctions—Item Page: 1991 Explorer Eddie Bauer No Reserve: Bid History", [Online]. Retrieved from the Internet: <http://web.archive.org/web/200012030838/http://page.auctions.yahoo.com/show/bid_hist?aID=43742589>, (Archived Dec. 3, 2000), 2 pgs.

"Yahoo! Auctions Help, Can I get additional information on payment options", Yahoo! Help—How to sell, [Online]. Retrieved from the Internet: <URL: http://replay.waybackmachine.org/2000816065243/http://help.yahoo.com/help/us/auct>, 2 pages.

"Yahoo! Auctions Help: Can I get Additional Information on Payment Options" [Online]. Retrieved from the Internet: <URL: http://web.archive.org/web/20060517173330/http://help.yahoo.com/help/us/auct/asell/asell-24.html>, (Archived Aug. 16, 2000), 2 pgs.

"Yahoo! Auctions Help: How do I sell an item?", [Online]. Retrieved from the Internet: <http://web.archive.org/web/20001018053102/http://help.yahoo.com/help/us/auct/asell/asell-01.html>, (Archived Oct. 18, 2000), 3 pgs.

"Yahoo! Auctions Help: What are the payment options?", [Online], Retrieved from the Internet: <http://web.archive.org/web/20000819092553/http://help.yahoo.com/help/us/auct/asell/asell-10.html>, (Archived Aug. 19, 2000), 1 pg.

"Yahoo! Auctions Help: What is Yahoo! PayDirect, and how do I send and receive money by email with PayDirect?", [Online]. Retrieved from the Internet: <http://web.archive.org/web/20000815075802/http://help.yahoo.com/help/us/auct/asell/asell-50.html>, (Archived Aug. 15, 2000), 2 pgs.

"Yahoo! Auctions: Hot Auctions", [Online]. Retrieved from the Internet: <http://web.archive.org/web/20001110114700/auctions.yahoo,com/>, (Archived Nov. 10, 2000), 1 pg.

"Yahoo! Auctions: PayDirect Sweepstakes Starts Today!", [Online]. Retrieved from the Internet: <http://vendio.com/mesg/read.html?num=6&thread=8118>, (Nov. 5, 2000), 4 pgs.

"Yahoo! Launches Yahoo! PayDirect for Online Person-to-Person Payments; Relationship with CIBC National Bank Allows Consumers to Easily Send and Receive Payments Via Email", Business Wire, [Online]. Retrieved from the Internet: <http://www.thefreelibrary.com/Yahoo!+Launches+Yahoo!+PayDirect+for+Online+Person-to-Person...-a063762721>, (Jul. 31, 2000), 4 pgs.

"Yahoo! PayDirect Help: Can I transfer funds directly to or from my checking or savings account?",[Online]. Retrieved from the Internet: <http://web.archive.org/web/20001018185346/http://help.yahoo.com/help/us/paydirect/paydirect-05.html>, (Archived Oct. 18, 2000), 1 pg.

"Yahoo! PayDirect Help: How do I send money to someone?", [Online]. Retrieved from the Internet: <http://web.archive.org/web/20001018042431/http://help.yahoo.com/help/us/paydirect/paydirect-17.html>, (Archived Oct. 18, 2000), 1 pg.

"Yahoo! PayDirect Help: Is a Yahoo! PayDirect account a bank account?", [Online]. Retrieved from the Internet: <URL: http://web.archive.org/web/20000819010907/http://help.yahoo.com/help/us/paydirect/paydirect-10.html>, (Archived Aug. 19, 2000), 1 pg.

"Yahoo! PayDirect Help: Is there a fee for using Yahoo! PayDirect?", [Online]. Retrieved from the Internet: <URL: http://web.archive.org/web/20001018173813/http://help.yahoo.com/help/us/paydirect/paydirect-03.html>, (Archived Oct. 18, 2001), 1 pg.

"Yahoo! PayDirect Help: What does "Move Money" do?", [Online]. Retrieved from the Internet: <http://web.archive.org/web/20001018104539/http://help.yahoo.com/help/us/paydirect/paydirect-20.html>, (Archived Oct. 18, 2000), 1 pg.

"Yahoo! PayDirect Terms of Service", [Online]. Retrieved from the Internet: <http://replay.waybackmachine.org/web/20001018052407/http://paydirect.yahoo.com/PD/ui/pd/helpitos.pd?>, (Archived Oct. 18, 2000), 9 pgs.

"Yahoo! PayDirect: How it Works?", [Online], Retrieved from the Internet: <URL: http://classic-web.archive.org/web/20000816070439/paydirect.yahoo.com/PD/ui/pd/help/ho>, (Archived Aug. 18, 2000), 2 pgs.

"Yahoo! PayDirect: Send and receive money online with Yahoo! PayDirect", [Online]. Retrieved from the Internet: <http://web.archive.org/web/20000815080153/http://paydirect.yahoo.com/>, (Archived Aug. 15, 2000), 1 pg.

"ZDNet Interactive Week Online News: E-Payments That Really Work", [Online]. Retrieved from the Internet: <URL: http://web.archive.org/web/20000511024543/http://www.zdnet.comlintweek/stories/news/0,4 164,2469976,00.html>, (Archived May 11, 2000), 4 pgs.

Duffy, Matt, "AuctionWatch Profile: Amazon.com", [Online]. Retrieved from the Internet: <URL: http://web.archive.org/web/20010303120333/http://www.auctionwatch.com/awdaily/reviews/profiles/amazon2.html>, (Archived Mar. 3, 2001), 3 pgs.

Duffy, Matt, "AuctionWatch Profile: BillPoint", [Online]. Retrieved from the Internet: <URL: http://web.archive.org/web/20010303041122/http://www.auctionwatch.com/awdaily/reviews/profiles/ballpoint2.html>, (Archived Mar. 3, 2001), 3 pgs.

Duffy, Matt, "AuctionWatch Review: Amazon.com", [Online]. Retrieved from the Internet: <URL: http://web.archive.org/web/200102040359/http://www.auctionwatch.com/awdaily/reviews/profilesiamazon.html>, (Archived Feb. 4, 2001), 2 pgs.

Duffy, Matt, "AuctionWatch Review: BillPoint", [Online]. Retrieved from the Internet: <URL: http://web.archive.org/web/200102040309/http://www.auctionwatch.com/awdaily/reviews/profiles/billpoint.html>, (Archived Feb. 4, 2001), 3 pgs.

Duffy, Matt, "AuctionWatch Review: Yahoo!0 PayDirect", [Online]. Retrieved from the Internet: <URL: http://web.archive.org/web/200101232145/http://www.auctionwatch.com/awdaily/reviews/profies/paydirect.html>, (Archived Jan. 26, 2001), 1 pg.

Godwin, Jennifer, "Reverse-Auction Site Wins Support", Forbes, [Online]. Retrieved from the Internet: <URL: http://web.archive.org/web/20010611113917/http://www.forbes.com/2000/06/06/mu1.html>, (Jun. 6, 2000), 2 pgs.

Holden, Greg, "", Internet Auction for Dummies, IDG Books Worldwide, (1999), 362 pgs.

Kytojoki, Jari, et al., "Micropayments—Requirements and Solutions", Department of Computer Science, Helsinki University of Technology, (Jan. 10, 2000), 32 pgs.

Neuman, Clifford B, et al., "Requirements for Network Payment: the NetCheque Perspective", Proceedings of IEEE Compcon, (Mar. 1995), 5 pgs.

Reichard, Kevin. "Emaze Auctions 2.1—eCommerce Guide", [Online]. Retrieved from the Internet: <http://www.ecommerceguide.com/resources/product_reviews/article.php/157511>, (Jul. 7, 1999), 6 pgs.

Rowan, Wingham, "Guaranteed electronic markets: the backbone of a twenty first century economy", (1997), 76 pgs.

Rowan, Wingham, "net benefit: Guaranteed Electronic Markets: the ultimate potential of online trade". (1999), 265 pgs.

Sacks, David, "System and Method for Instant Payments", U.S. Appl. No. 60/217,219, filed Jul. 11, 2000, 6 pgs.

Sandoval, Greg, "X.Com ceases banking operations", CNET News, [Online]. Retrieved from the Internet: <URL: http://news.cnet.com/2100-1017-248389.html>, (Aug. 9, 2000), 4 pgs.

Steiner, Ina, "BidPay.com Offers Click and Pay Service for Buyers", Auction Bytes, [Online]. Retrieved from the Internet: <http://www.auctionbytes.com/cab/abu/y200/m01/abu0006/s04>, (Jan. 22, 2000), 3 pgs.

Tolliver, Craig, "X.com: X.com opens its virtual doors: New wave for financial services?", CBS MarketWatch, [Online], Retrieved from the Internet: <URL: http://web.archive.org/web/20000301165053/http://www.x.com/external_CBS_.interview.htm >, (Dec. 10, 1999), 4 pgs.

* cited by examiner

Auto-Pay: Enter Credit Card Information

Enter your credit card information, then click the Continue button below. Your information is secure and your credit card number will not be sent to the seller (If you prefer, you can enter your electronic check information instead.)

Note: You will only be charged if you're the high bidder when this item ends.

| | |
|---|---|
| Credit card | Visa ▽ |
| Credit card number | [                    ]  Example: 1234 1234 1234 1234 |
| Expiration date | -Month- ▽   -Year- ▽ |
| Cardholder name | Pat    Z    Smith<br>First  M.I.  Last |
| Street<br>Enter the address on your monthly billing statement | 20 Dana St.<br>[                    ] |
| City | San Jose |
| State/province/region | CA<br>U.S. Residents: enter state code (for example NY). |
| Zip/postal code | 95136 |
| Country | United States ▽ |
| Phone | (408) 555-1212<br>Example: (408) 555-1212 |

You will only be charged if you're the high bidder when this item ends.

End of Auction Seller: Auction Item Sale Notification

*Example Email: EOA Seller Auction Item Sold (Checkout on)*
*Call to Action: Send Invoice*

From: endofauction@abc.com
Sent: Saturday, April 20, 2002 3:30 PM
To: elsajames@best.com
Subject: Item Purchase: Lenny Kravitz CD LENNY , 2002 Brand New!!! (Item # 1234545)

Congratulations bobsmusic!

Dear bobsmusic,
The following item was won by elsa2000.

| Item Name | Item Price | Qty | Subtotal |
|---|---|---|---|
| Lenny Kravitz CD, LENNY, 2002 Brand New !!! (1234545) | $7.95 | 1 | $7.95* |
| | | | *Does not include shipping charges |

Auto-Pay Selected

The buyer has elected to pay for this item with a credit card through Payments. It is not currently necessary for you to contact the buyer to arrange for payment. After the buyer's credit card has been charged successfully (within 24 hours), you will be notified by e-mail to ship this item.

*Note: The buyer has been sent a separate email to confirm this sale.*
*Don't forget to leave feedback after the sale is complete!*

Listing Details

| | |
|---|---|
| Item name: | New!~Lenny Kravitz CD, LENNY~ RARE! |
| Item number: | 873976765 |
| End Date: | Apr-19-02 15:30:01 PST |

End of Auction Buyer

*Example Email:* EOA Bidder
*Call to Action:* Pay Now!

From: endofauction@abc.com
Sent: Saturday, April 20, 2002 3:30 PM
To: elsajames@best.com
Subject: You won! Lenny Kravitz CD LENNY, 2002 Brand New!!! (Item # 1234545)

Congratulations elsa2000!

Dear elsa2000
You have own the following Item from bobsmusic.,
The following itemwas won by elsa2000.
You won! Lenny Kravitz CD LENNY, 2002 Brand New!!! # 1234545
Auto-Pay Selected

As a reminder, you have elected to pay for this item with a credit card through Payments. We will attempt to charge your credit card the total amount of <$ total amount> and notify you via e-mail within 24 hours once the charge has been accepted. It is not currently necessary for you to contact the seller to arrange for payment.

| Payment Details: | | Payment Instrucions from Seller: |
|---|---|---|
| Item Price | $11.52 | I accept Payments, credit card, or money order. |
| Quantity | 1 | I also accept personal checks with a |
| Subtotal | $11.52 | possible 5 to 7 day wait until the check clears. |
| U.S. Shipping and Handling | $2.79 | Payment must be received within 10 days. |
| Shipping Insurance per item: (optional) | $1.21 | |
| Sales Tax: | 8.25% | |

Auto-Pay Settings

These are the items you're currently bidding on. You may update any of your Auto-Pay settings below.
✓ = Items you're currently winning    ✗ = Items you're currently not winning
Multiple Item Auctions (Dutch Auctions) do not use color coding.

| Auto-Pay Status ▽ | Shipping & payment info | Item# | Item Title | Current Price | My Max Bid | Seller |
|---|---|---|---|---|---|---|
| On (Turn Off) | Update | 2108691703 | PALO ALTO CALIFORNIA STREET SCENE 1950'S | $5.25 ✗ | $4.12 | carey-n-trish |
| Off (Bid Again) | -- | 1122334455 | UNIVERSITY AVE -- YOU NEED THIS! | $18.99 ✗ | $4.52 | soliner@yahoo.com |
| Off (Turn On) | -- | 2107951143 | PALO ALTO DC UNIVERSITY AVE 1908! | $6.07 ✓ | $6.07 | soliner@yahoo.com |
| Auto-Pay not available | -- | 2111518219 | POST OFFICE Stanford U. 1949 | $6.07 ✓ | $6.07 | oldstuffisus |

Go to My Bidding/Watching page

Fig. 11

Congratulations...
You are the current high bidder

Current bid price: $2.74
Your maximum bid: $2.74

Can you still be outbid?
Yes - although you are currently the high bidder, this does not guarantee you will win this auction. Another user may outbid you, so check back before the auction ends or allow us to bid on your behalf. How does Proxy bidding work?

Auto-Pay is available: Automatically pay for this item if you're the high bidder when the listing ends. Auto-Pay is worry-free, fast, and easy. (Available for U.S. shipping addresses only.)

Turn On Auto-Pay > Electronic Payments

Note: You can review payment and shipping details on the following steps. Learn more about Auto-Pay.

Other related items from the same seller:

| Ca Street Scene in Los Angeles ....189 Bid Price: $6.50 | Ca Street Scene in Lynwood ....184 Bid Price: $6.50 | Ca Street Scene in Indio ....172 Bid Price: $6.50 |

Keeping track of your bids
You can keep track of your bids by looking at your 'Bidding/Watching' page. This is a convenient at-a-glance buying/selling activity page accessible only by you. Try it now! It's free Notifications - *What happens if you are outbid?*

Fig. 13B

Turn on Auto-Pay

Review your information, then click the Submit button.

Note: You will only be charged if you're the high bidder when this listing ends.

49ers JERRY RICE signed 1988 Topps dard (#1832544266)
your current bid*  $2.74
Shipping and handling  $1.00
Shipping insurance (optional)  add $1.10

*your maximum bid is $3.00

Shipping address
Pat Smith
20 Dana St.
San Jose, CA 95136
US
(408) 555-1212
change shipping address Payment Method
Credit Card
Visa (expires 3/2004)
Change to electronic check | Change credit card  } 1352

You will be charged if you're the
high bidder when this listing ends. — 1351

[ Submit ]

Payments Help

Auto-Pay: If you win
this item, you will
automatically be
charged and the seller
will be notified to send
the item to the address
you specify.
Learn more.

Items I'm Bidding On (1 item)

✓ = Items you're currently winning  ✗ = Items you're currently not winning
Multiple Item Auctions (Dutch Auctions) do not use color coding.

All item details
Auto-Pay Settings — 1380 Link to "Auto-Pay Settings" panel

| Item# | Start Price | Current Price | My Max Bid | Qty | # of Bids | Start Date | (PST) End Date | Time Left |
|---|---|---|---|---|---|---|---|---|
| 1744185453 | $5.00 | $5.50 ✗ | $5.00 | 1 | 2 | Jun-24 | Jul-01 19:57:20 | 4d 23h 23m |
| Page Total: | | $0.00 | $5.00 | 0 | 0 | | | |
| (Items I'm winning) | | | | | | | | |

Showing Items 1 - 1 of 1

Back to top ↑

Items I've Won (6 items)

△ Show items for past [30] days [Go]  (30 days max)   □ Save this setting

| Select (all) | Item# | (PST) End Date ▲ | End Price | Qty | Pay with E Payments | Seller | Checkout | Leave Feedback |

Checkout Prefs page

Allow Checkout
Tip: Use Checkout to help your buyers know how much to pay you once your listing ends. (learn)more

- ⦿ Yes, display E's Checkout button to auction buyers after the listing ends
- ○ No, do not desplay E's Checkout button

Payment Address
optional

This is the address your buyers will see at Checkout only if they are making payment.

This applies to all of your listings (auction, E Store & Buy It Now).

Contact name: ▭ ▭
Address: ▭
Address continue: ▭
optional
City: ▭
State/Province: ▭
ZIP/Postal Code: ▭
Country: ▭
Primary phone number: ▭
optional ☐ Remember my Payment Address and don't request it the next time I list an item.
☐ Delete Payment Address

Allow buyer to edit or enter total
☑ Allow buyer to enter total during Checkout to include any additional costs. Learn more.

Allow Auto-Pay
☑ Allow buyer to pay through Auto-Pay. This ensures the fastest payment possible. Learn more.

1400

1401 — New Auto-Pay preferences section

Fig. 14

METHOD AND SYSTEM TO AUTOMATE PAYMENT FOR A COMMERCE TRANSACTION

CROSS-REFERENCE TO RELATED APPLICATION

This application is a divisional application of U.S. application Ser. No. 10/427,553 filed Apr. 30, 2003, which is incorporated in its entirety herein by reference.

FIELD OF THE INVENTION

The present invention relates generally to the field of network-based commerce and, more specifically, to a method and system to automate payment for a commerce transaction.

BACKGROUND OF THE INVENTION

With the wide spread acceptance of the Internet as an ubiquitous, interactive communication and interaction platform, on-line (or electronic) commerce conducted over the Internet has become commonplace in a variety of business environments. On-line commerce is traditionally categorized as business-to-business (B2B), business-to-consumer (B2C), consumer-to-consumer (C2C) and even business-to-employee (B2E) commerce. In the B2B environment, a number of online exchanges or marketplaces (e.g., vertical exchanges) have been established with a view to facilitating electronic commerce between parties, for example, within a vertical supply chain. Such B2B exchanges typically provide a number of tools for facilitating commerce, such as aggregated and near real-time inventory information, Requests for Quotation (RFQ) capabilities and auctions.

In the B2C and C2C environments, a number of marketplace exchanges and transaction facilities have proved popular. A leading electronic commerce system (or marketplace) is operated by eBay, Incorporated. Electronic marketplaces are also provided by Yahoo! Incorporated and Amazon.com. Further, a number of on-line services offer on-line classifieds, such as the Yahoo! Classifieds service offered by Yahoo! Incorporated.

A number of the on-line marketplaces are utilized by merchants as an important, if not a primary, distribution channel for products. Further, various retailers and merchants also utilize free, or low-cost, classified advertisement services offered on the Internet, such as Yahoo! Classifieds.

In order to complete the purchase of these products, buyers generally provide checkout information such as credit card numbers, checking account numbers and shipping addresses to the seller upon winning or completing the purchase. In the case of on-line auctions, sellers often wait days or weeks for the buyer's check out information, or never receive it at all and are forced to relist the item. Additionally, buyers forget to provide their checkout information.

SUMMARY OF THE INVENTION

A method and system to automate payment for a network-based commerce transaction have been disclosed. In one embodiment, a method comprises providing a buyer an option to enable auto-pay, wherein auto-pay automatically provides payment to a seller upon a termination event of a network-based commerce transaction. Payment information of the buyer is provided to a network-based payment system upon the occurrence of the termination event.

BRIEF DESCRIPTION OF THE DRAWINGS

The present invention is illustrated by way of example and not limitation in the figures of the accompanying drawings, in which like references indicate similar elements and in which:

FIG. 7 illustrates a graphical user interface that is presented to a buyer to facilitate entry of electronic payment information.

FIG. 8 illustrates a graphical user interface that is presented to a seller as confirmation of the end of an auction implementing auto-pay.

FIG. 9 illustrates a graphical user interface that is presented to a buyer when the buyer wins an auction implementing auto-pay.

FIG. 11 illustrates a graphical user interface presented to a buyer that is an auto-pay panel that lists multiple items the buyer is bidding on.

FIG. 13B illustrates an exemplary graphical user interface of a bid confirmation page.

FIG. 13C illustrates an exemplary graphical user interface to review a buyer's auto-pay shipping and payment information.

FIG. 13D illustrates an exemplary graphical user interface that allows a buyer to view his/her auto-pay setting.

FIG. 14 illustrates an exemplary graphical user interface for a seller enabling auto-pay

DETAILED DESCRIPTION

A method and system to automate payment for commerce transactions are described. In the following description, for purposes of explanation, numerous specific details are set forth in order to provide a thorough understanding of the present invention. It will be evident, however, to one skilled in the art that the present invention may be practiced without these specific details.

Terminology

The term "user" shall be taken to refer to any entity, human or automated, that contributes to, or participates in, a transaction, communication or process.

The term "transaction" shall be taken to include any communication or exchange between two or more parties with a view to establishing a business agreement, exchange of value or a commercial relationship. Accordingly, the word "transaction" shall be deemed to cover, but not be limited to, a purchase-and-sale transaction established as a result, for example, of the placement of an advertisement or as a result of the conclusion of an auction process, the auction process being conducted on-line or otherwise.

While an exemplary embodiment of the present invention is discussed below with reference to "items", it will be appreciated that the present invention is not so limited. Accordingly, the word "item" shall be deemed to cover, but not be limited to, a transaction listing, in which both items and services may be included.

Commerce System

Figure 1:
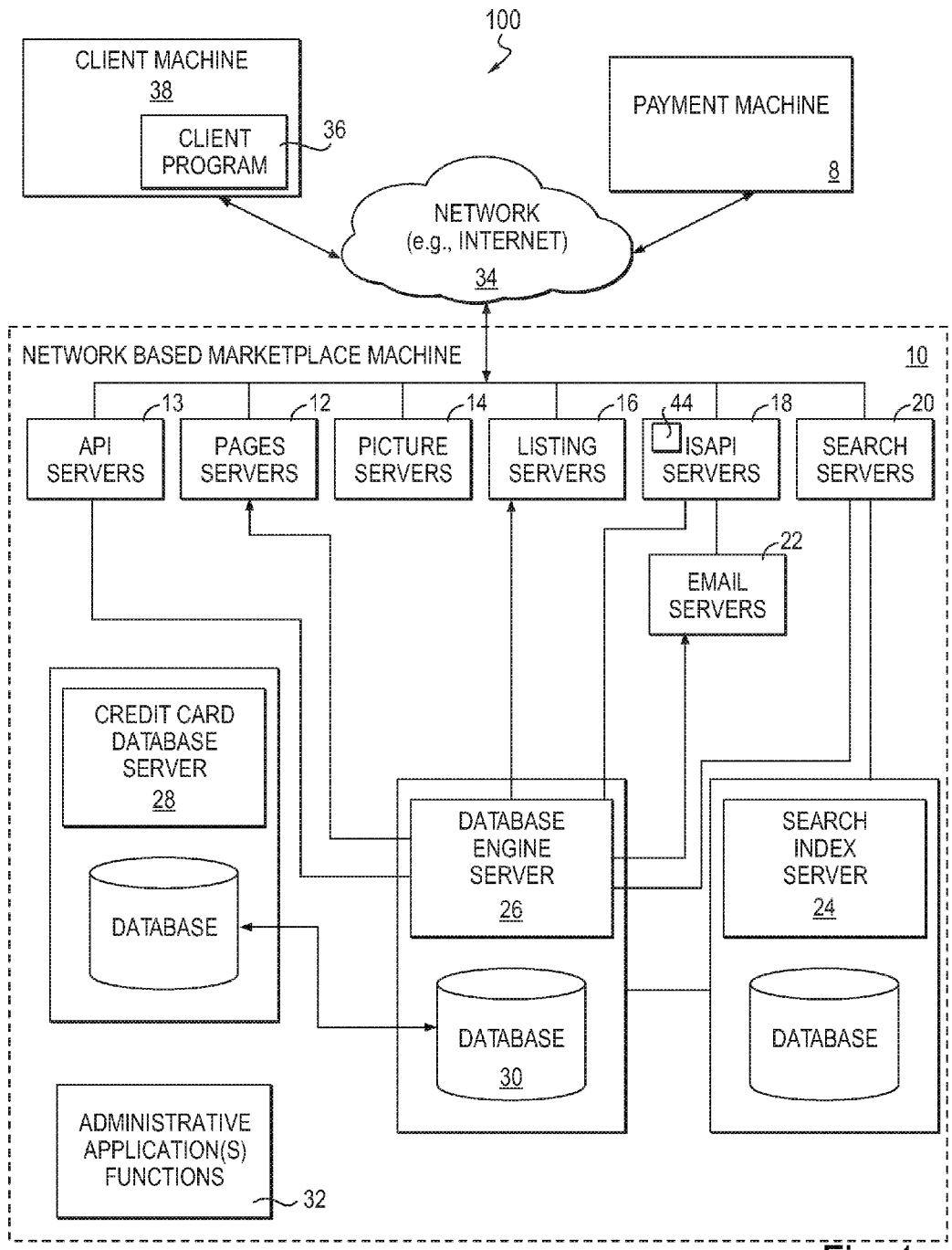
FIG. 1 is a block diagram illustrating an exemplary network-based, according to one embodiment of the present invention.

FIG. 1 is a block diagram illustrating a commerce system 100, and the software and hardware components of a network-based marketplace machine 10, a client machine 38, and a partner machine 8, according to an exemplary embodiment of the present invention. The system 100 includes the client machine 12, and the network-based marketplace machine 10, that communicate via a network 22. The network 34 may be embodied as Internet, a LAN, a WAN, PSTN, Frame Relay, ATM, satellite communications, wireless communications, combinations thereof, or any other network equipment or protocol that enables electronic communication between the above described network entities.

Figure 2:
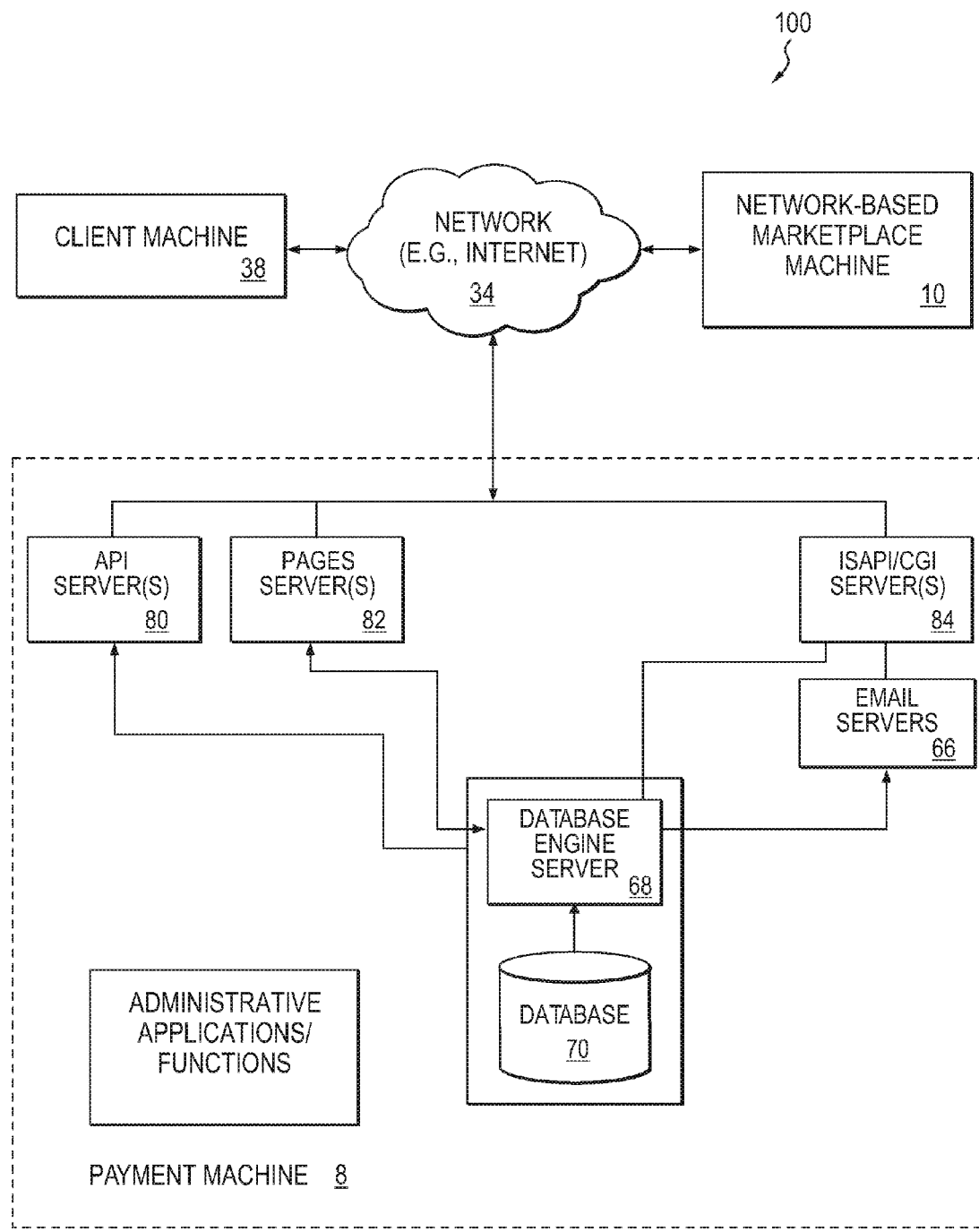
FIG. 2 is a block diagram illustrating an exemplary network-based payment system environment, according to an exemplary embodiment of the present invention.

The client machine 38 enables the client to access services that are provided by the network-based marketplace machine 10 and, a payment machine 8, illustrated more fully in FIG. 2.

The network-based marketplace machine 10 provides online marketplace services that enable sellers and buyers to transact items and services. A buyer that submits a winning bid in an auction or executes a purchase to complete a sale may acquire goods and/or services from the seller.

In one embodiment the network-based marketplace machine 10 may be embodied as "eBay The World's Online Marketplace"™ created by eBay of San Jose, Calif.

The payment machine 8 provides payment services that enable a user to electronically send and receive payments over the network 34. For example, the payment machine 16 may be embodied as the PayPal™ Payment Service operated by PayPal of San Jose, Calif. Additional embodiments of payment machine 16 may be Western Union® BidPay™ Payment Service operated by BidPay.com, Inc. of Bridgeton, Mo.; Bill Me Later® operated by I$^4$ Commerce™ of Timonium, Md.; or other similar electronic payment systems. In alternate embodiments, payment machine 8 is integrated with network-based marketplace machine 10.

In addition to other software components that are not illustrated, the client machine 38 includes a client communication program 36. The client communication program 36 enables a user to display web pages or e-mail messages that are loaded from server computers. The client communication program 36 may be embodied as a browser (e.g., the Microsoft Internet Explorer browser developed by Microsoft™ Corporation of Richmond, Wash. or Navigator™ browser developed by Netscape of Mountain View, Calif.). The client communication program 36 executes under an operating system (e.g., Microsoft™ Windows developed by Microsoft™ Corporation or Mac OS X developed by Apple Computer of Cupertino, Calif.) The client communication program 36 may also be embodied as a mail client (e.g., the Microsoft Outlook personal information manager developed, by Microsoft™ Corporation of Richmond, Wash. or Lotus Notes™ developed by the Lotus Notes Development Corporation.

The network-based marketplace machine 10 includes one or more of a number of types of front-end servers, namely communications servers in the exemplary form of an application program interface (API) servers 13, page servers 12 that deliver web pages (e.g., markup language documents), picture servers 14 that dynamically deliver images to be displayed within Web pages, listing servers 16, processing servers in the exemplary form of CGI (or ISAPI) servers 18 that provide an intelligent interface to back-end servers, and search servers 20 that handle search requests to the network-based marketplace machine 10. The e-mail servers 22 provide, inter alia, automated e-mail communications to users of the network-based marketplace machine 10. The ISAPI servers 18 host an auto-pay module 44. Although illustrated as part of ISAPI servers 18, auto-pay module 44 can be distributed throughout the servers of the network based market machine 10, as well as embodied as an independent server. Auto-pay module 44 allows for the use of auto-pay. When auto-pay is used, a network-based commerce transaction is automatically completed. In other words, money is automatically transferred from a purchaser's financial account to the seller's financial account because the purchaser and seller have both provided their respective information, prior to the close of the transaction.

The back-end servers include a database engine server 26, a search index server 24 and a credit card database server 28, each of which maintains and facilitates access to a respective database.

FIG. 2 is a block diagram illustrating hardware components of the payment machine 8 utilized by the system 100, according to an exemplary embodiment of the present invention. The payment machine 8 includes one or more of a number of types of front-end servers, namely communications servers in the exemplary form of an application program interface (API) servers 80, page servers 82 that deliver web pages (e.g., markup language documents), processing servers in the exemplary form of CGI (or ISAPI) servers 84 that provide an intelligent interface to back-end servers. The e-mail servers 66 provide, inter alia, automated e-mail communications to users of the payment machine 168. The back-end servers include database engine servers 68 that maintains and facilitates access to a database 70.

Database Structure

Figure 3:
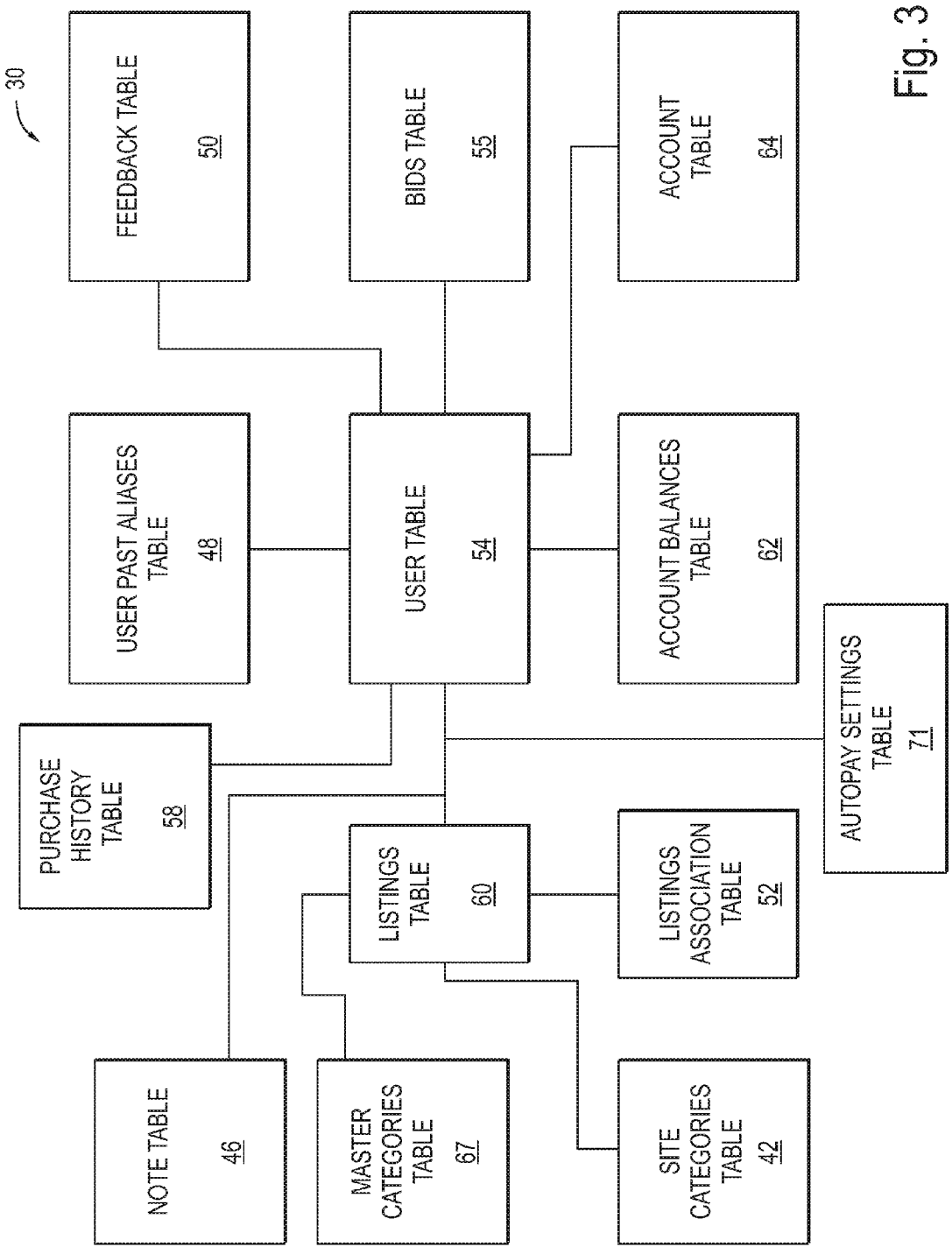
FIG. 3 is a database diagram illustrating an exemplary database maintained and accessed by a database engine server of the network-based commerce system.

FIG. 3 is a database diagram illustrating an exemplary database 30 maintained and accessed via a database engine server 26 that supports the network-based marketplace machine 10. The database 30 may, in one embodiment, be implemented as a relational database, and includes a number of tables having entries, or records, that are linked by indices and keys. In an alternative embodiment, the database 30 may be implemented as a collection of objects in an object oriented database.

The database 30 includes a user table 54 that contains a record for each user of the network-based marketplace machine 10. The user may operate as a seller, buyer, or both, with respect to the network-based marketplace machine 10. The database 30 also includes listings table 60 that may be linked to the user table 54 and a listing association table 52. A user record in the user table 54 may be linked to multiple items that are being, or have been, transacted via the network-based marketplace machine 10.

The number of other tables are also shown to be linked to the user table 54, namely a user past aliases table 48, a feedback table 50, a bids table 55, an account table 64, an account balances table 62 and a purchase history table 58. The masters categories table 67 stores records for listing categories presented across multiple views (or presentations) of list categories via regional or community sites presented by the network-based marketplace machine 10. A site categories table 42 stores records indicating which item categories are to be presented for respective regional or community sites (e.g., a country, region or city specific site) presented by the network-based marketplace machine 10.

Figure 4:
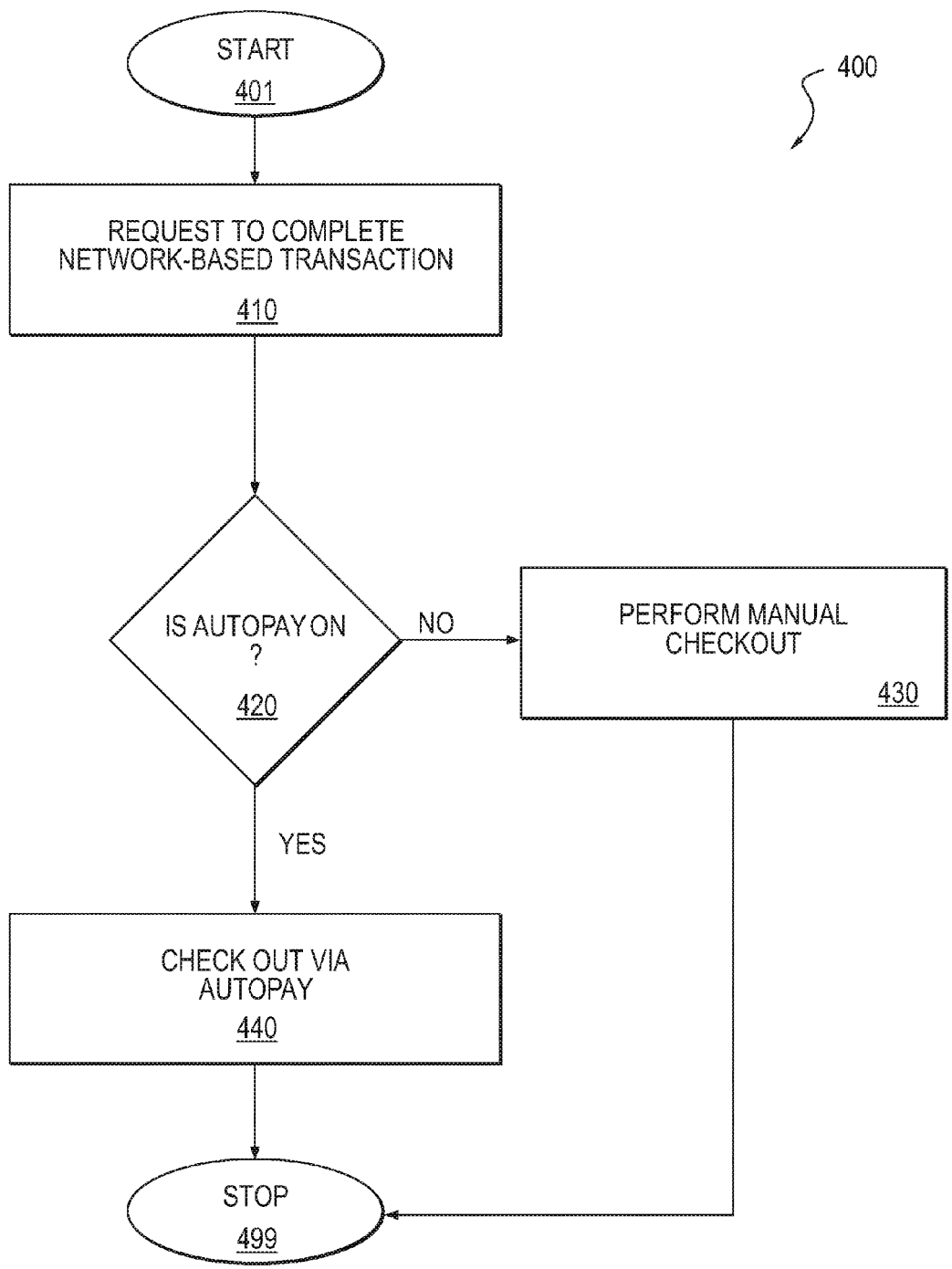
FIG. 4 is a flow chart illustrating a method, according to an exemplary embodiment of the present invention, performed by the auto-pay module to complete a network-based commerce transaction.

FIG. 4 is a flow chart illustrating a method 400, according to an exemplary embodiment of the present invention, performed by the marketplace machine 10 to establish a network-based commerce transaction. The method 400 commences at block 401. At block 410, a user requests that a network-based commerce transaction be established. The request can be any of a multitude of user-initiated or system-initiated events. For example, the user can be a winning bidder, and the network-based commerce transaction can be an on-line auction. The user's request is automatically generated by marketplace machine 10, once the on-line auction closes and the user is identified as the highest bidder. During the pendancy of the on-line auction, database engine server 26 maintains listings table 60 including all the tables that support the listings, such maintenance including updating bids stored in bids table 55 from various bidders. Additionally, database engine server 26 maintains an auto-pay settings table 71 for each record in the listings table 60. Auto-pay settings table 71 indicates whether the transaction is to be completed using auto-pay.

Thus, when a request to complete a network-based commerce transaction is generated, at block 410, the auto-pay module 44 determines if auto-pay should be used at decision block 420, by examining auto-pay settings table 71. If the auto-pay table 71 indicates that auto-pay should not be used, then a manual checkout process is used to complete the network-based commerce transaction at block 430. If the auto-pay table 71 indicates that auto-pay should be used, then auto-pay module 44 is used to complete the network-based commerce transaction at block 440. The process ends at block 499.

Figure 5:
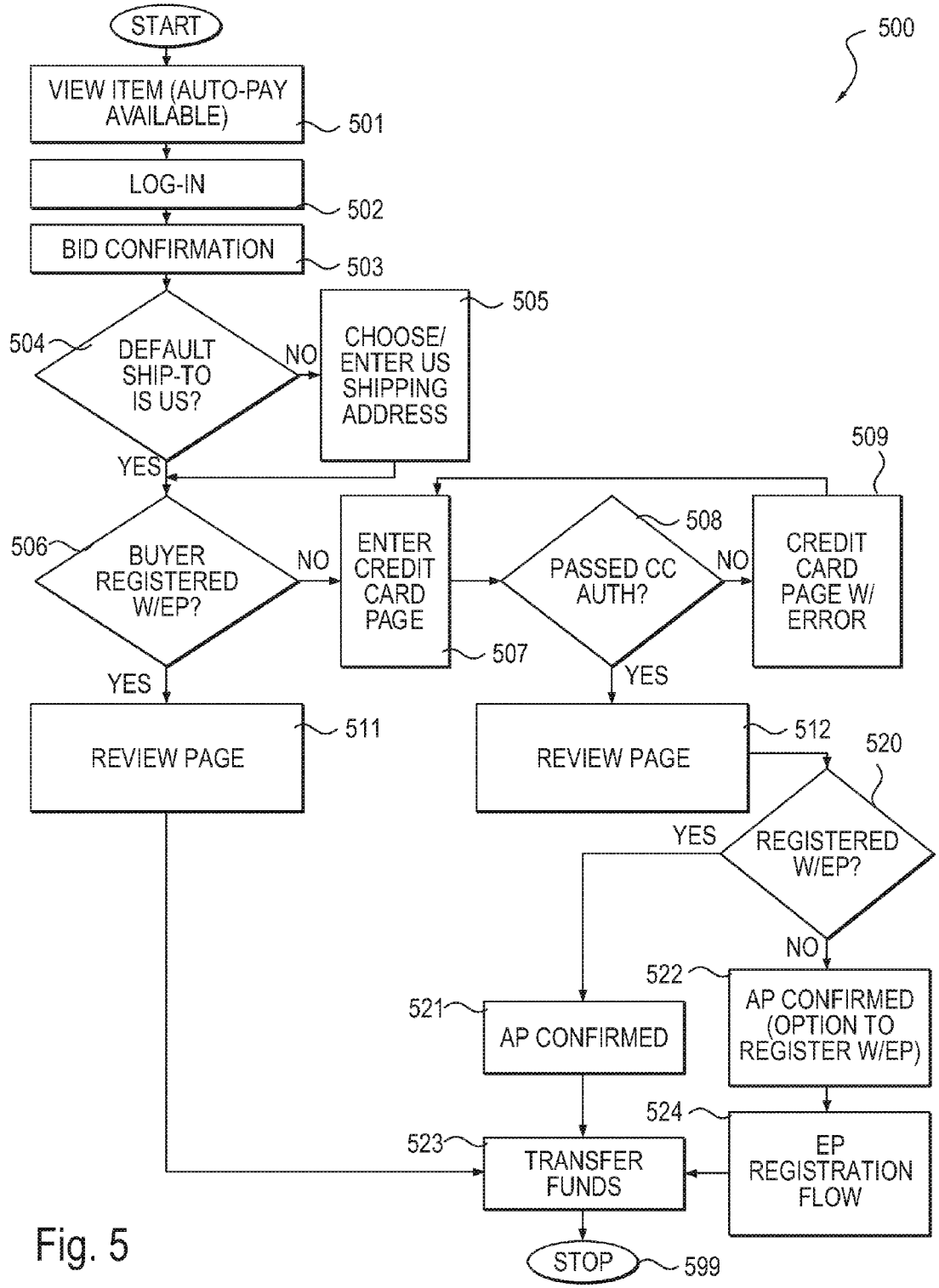
FIG. 5 is a detailed flow chart illustrating a method, according to an exemplary embodiment of the present invention, performed by a commence system to accomplish a manual checkout.

FIG. 5 is a detailed flow chart illustrating a method 500, according to an exemplary embodiment of the present invention, performed by marketplace machine 10, to accomplish a manual checkout. FIG. 5 uses as an example the checkout process upon winning an on-line auction. The method 500 commences at block 501 where a user, having received notification that the transaction obligations have been established, views the listing 70 via browser application 36. At block 502, the user logs-in and communicator module 75 verifies the user's identity. Marketplace machine 10 provides the user with a bid confirmation upon successful login at step 503.

At decision block 504, the marketplace machine 10 prompts the user 10 to respond whether his/her shipping address is within the United States. If the address is not within the United States, the user enters a shipping address in the United States at block 505. Upon entry of a United States address or if the address was a valid United States address, the marketplace machine 10 determines at block 506 if the buyer (user) is registered with an electronic payments system such as payment machine 8. If the user is not registered, the user is prompted to provide credit card information at block 507. At decision block 508, the marketplace machine 10 determines if the information provided by the user passes a standard credit card authorization process. If the authorization is not provided, a credit card page indicating the authorization error is provided to the user and the user is provided another opportunity to provide credit card information at block 507.

If credit card authorization is provided at decision block 508, then a reviewer page 72 is generated at block 512. At decision block 520, the marketplace machine 10 determines if the buyer is registered with an Electronic Payments (EP) System such as payment machine 8. If the buyer is registered, then an auto-pay confirmation is provided to the buyer at block 521. The buyer's financial account is debited and the seller's account is credited at block 523. If the buyer was not registered with an electronic payment system at decision block 520, then the buyer is still provided an auto-pay confirmation at block 522. Additionally, the buyer provided with the option to register with an electronic payment system. The registration process is completed at block 524 according to steps required by the specific EP system used and funds are transferred at block 523. Interactions with payment machine 8 may be necessary with blocks 520-524.

Returning to decision block 506, if the buyer is registered with an electronic payment system, a review page is provided to the buyer at block 511. After confirmation of the transaction, funds flare transferred from the buyer to the seller at block 523. The process ends at block 599.

Figure 6:
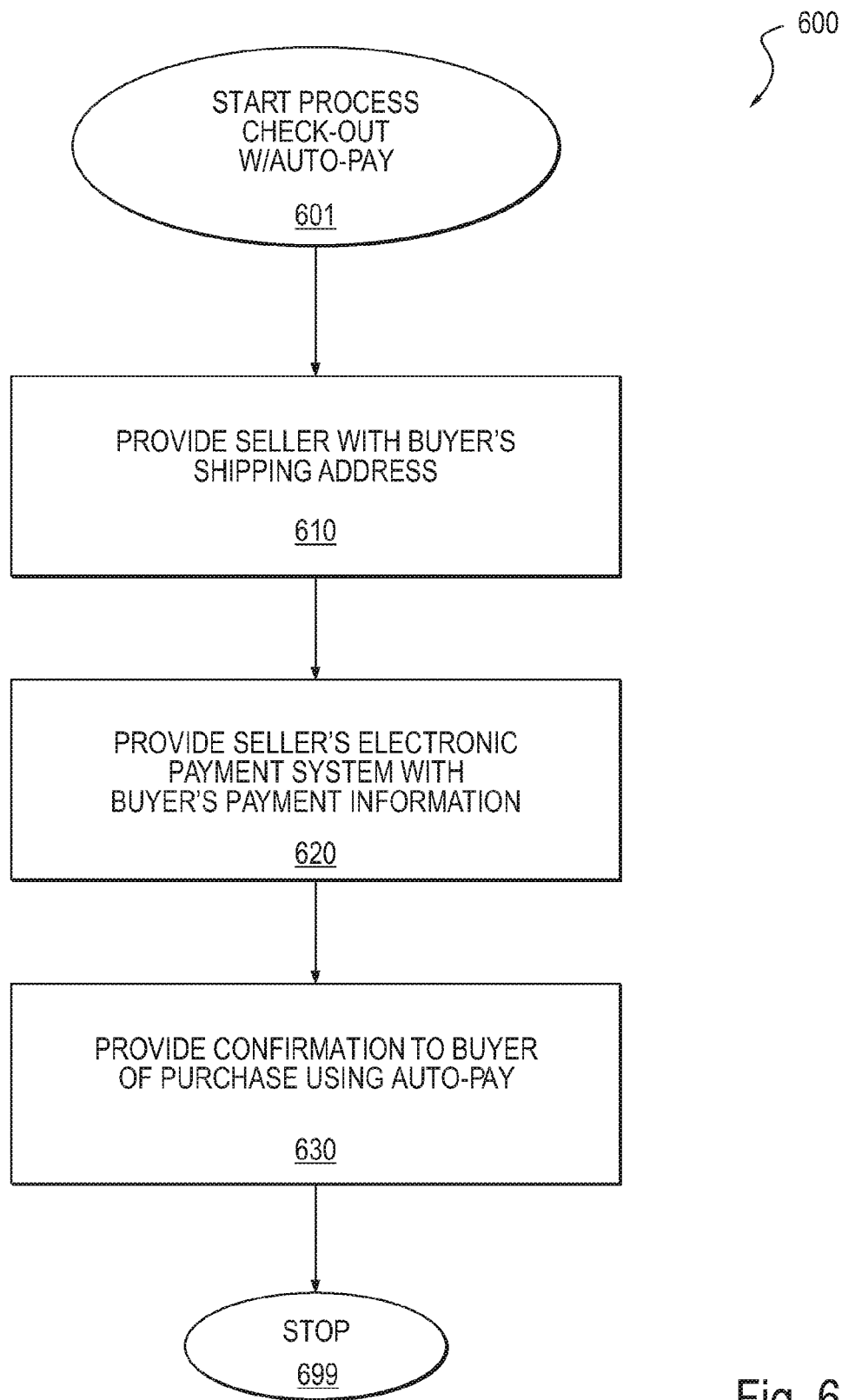
FIG. 6 is a high-level flow chart illustrating a method, according to an exemplary embodiment of the present invention, performed by a commerce system to checkout using auto-pay.

FIG. 6 is a high-level flow chart illustrating a method 600, according to an exemplary embodiment of the present invention, performed by marketplace machine 10, to checkout using auto-pay. The method 600 commences at block 601 and can be implemented within block 440 of FIG. 4. Prior to executing method 600, a seller has established an electronic payment account to which payment will be received. For example, the seller established an account with payment machine 8. The buyer's shipping address can be stored in account table 64 through the processing flow of processing block 505 of FIG. 5. The form of electronic payment can be stored in auto-pay settings table 71 through the processing flow of processing block 524 of FIG. 5. Additionally, the buyer has already configured his auto-pay account with a shipping address and a form of electronic payment.

Thus, at block 610, once a buyer has won an auction (or otherwise incurred a payment obligation), the marketplace machine 10 automatically provides the seller with the buyer's shipping address as the buyer provided above. The seller receives the buyer's payment information automatically at block 620. Prior to this transmission of payment information, the buyer provided his or her credit card information, and registered with payment machine 8. FIG. 7 illustrates a graphical user interface 7000 that can be presented to a buyer to facilitate entry of electronic payment information. Although credit card information is requested, other electronic payments are contemplated, including payments via electronic mail, tend electronic checks. Thus, the seller can receive the buyer's credit card information, or information regarding any other form of electronic payment. For example, the buyer's information can be provided directly to PayPal or a similar banking institution.

Returning to FIG. 6, at block 630, confirmations are provided to the buyer and seller for the purchase. FIG. 8 illustrates an exemplary, graphical user interface 8000 that can be presented to a seller as confirmation of the end of an auction implementing auto-pay. Interface 8000 states to the seller that the buyer has selected to use auto-pay. FIG. 9 illustrates an exemplary graphical user interface 9000 that can be presented to a buyer of the winning of an auction implementing auto-pay. Interface 9000 states to the buyer a reminder that the transaction will be completed using auto-pay. Both interface 8000 and 9000 can be e-mails to the seller and buyer respectively. Additionally, both interfaces of FIGS. 8 and 9 are generated via auto-pay module 44. The method ends at block 699.

Figure 10:
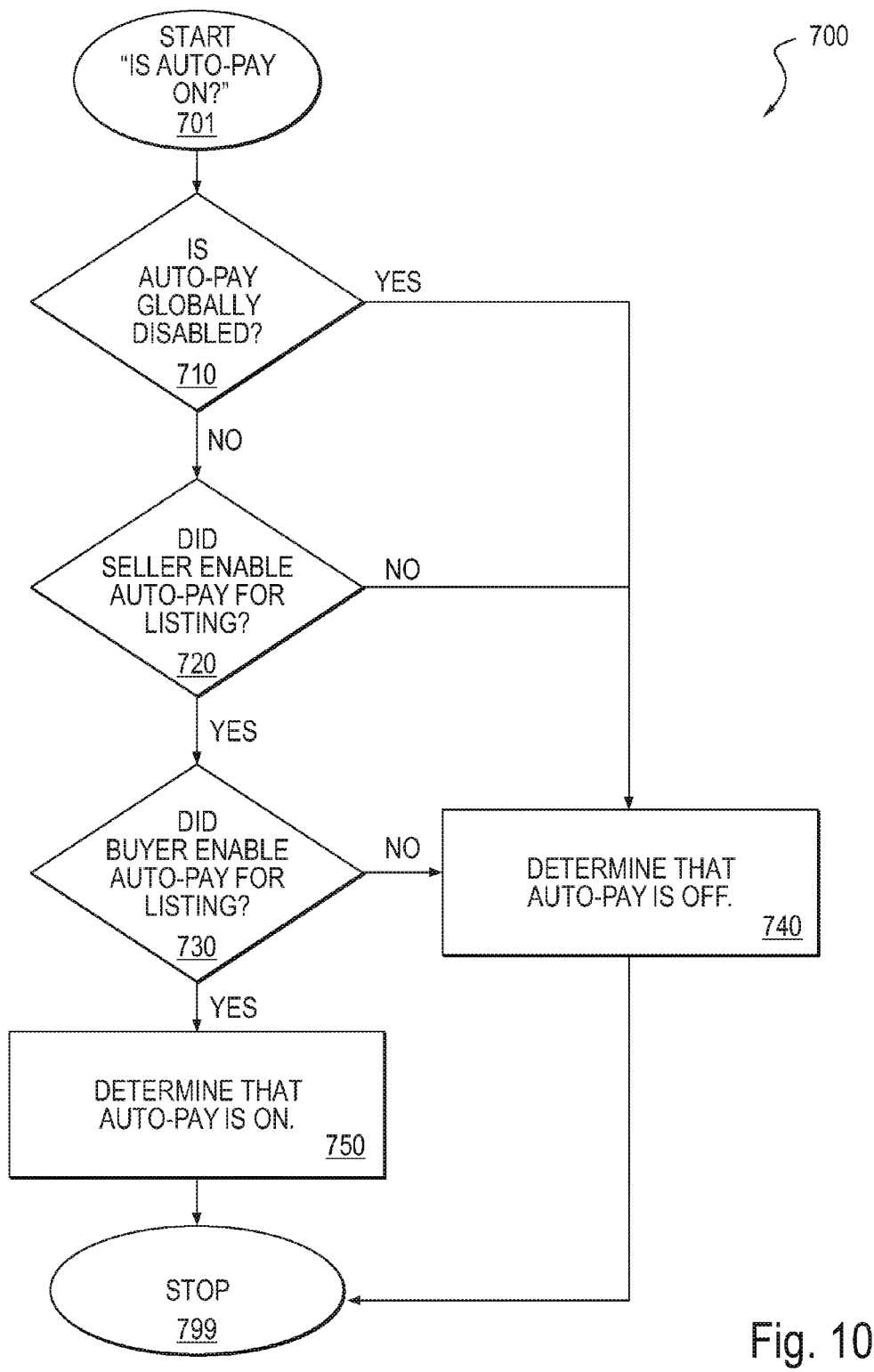
FIG. 10 is a high-level flow chart illustrating a method, according to an exemplary embodiment of the present invention, performed by an auto-pay module to determine if auto-pay is available.

Once an auction closes, the marketplace machine 10 determines if auto-pay is on and can be used for checkout. FIG. 10 is a high-level flow chart illustrating a method 700, according to an exemplary embodiment of the present invention, performed by auto-pay module 44, to determine if auto-pay should be used and if auto-pay is available for checkout purposes. The method 700 commences at block 701. Method 700 can be used to implement decision block 420 of FIG. 4.

At block 710, auto-pay module 44 checks if the seller globally disabled the auto-pay feature within his or her user profile by checking a global disable auto-pay field in auto-pay settings table 71. If auto-pay is globally disabled, it is determined that auto-pay is off at block 740 and the process ends at block 799. If auto-pay is off a manual checkout is performed according to block 430 of FIG. 4.

If auto-pay is not globally disabled, auto-pay module 44 determines if the seller enabled auto-pay for the particular listing at decision block 720. Auto-pay module 44 checks an auto-pay enabled field in listings table 60. If the seller did not enable auto-pay for the particular listing, then the process continues to block 740, as described above. At decision block 720, additional conditions can be imposed upon the seller. For example in order to enable auto-pay, shipping costs can be required to be provided, as well as tax and insurance costs.

If the seller enabled auto-pay for the particular listing and provided any required costs, then at decision block 730, auto-pay module 44 determines if the buyer enabled his payment via auto-pay for the specific listing. Auto-pay settings table 71 stores information regarding whether the buyer enabled auto-pay. If the buyer did not enable auto-pay then the process continues to block 740 as discussed above. If the buyer did enable auto-pay, then module 44 determines that auto-pay is on at block 750 and method 600 is completed. Also at block 750, upon determining that auto-pay is on, the auto-pay settings table 71 can be updated to reflect that auto-pay is or is not on and the payment flow of FIG. 6 is used. The process completes at block 799.

In an alternate embodiment, the seller can be left completely unaware of the fact that the buyer used auto-pay. In this embodiment, the seller has specified that he accepts credit card payments (or any similar type of instant funds transfer), and has specified the total cost of the item (including shipping costs, either fixed or actual). The buyer uses auto-pay to complete the transaction and the seller receives payment immediately once the listing ends. Furthermore, default settings can be established to allow auto-pay automatically.

FIG. 11 illustrates an exemplary graphical user interface (GUI) 1100 presented to a buyer that lists multiple items that he or she is bidding on. Interface 1100 displays whether auto-pay is on or off for each item listed. By manipulating GUI 1100 the buyer enables (or disables) auto-pay for a particular listing. The buyer's decision is queried at decision block 730 a discussed above in connection with FIG. 10.

Item 2108691703 is listed in FIG. 11. The auto-pay status column indicates that auto-pay is on for the listing and can be turned off by the user. Shipping and payment information can be updated for item 2108691703 as illustrated in GUI 1100.

Figure 12:
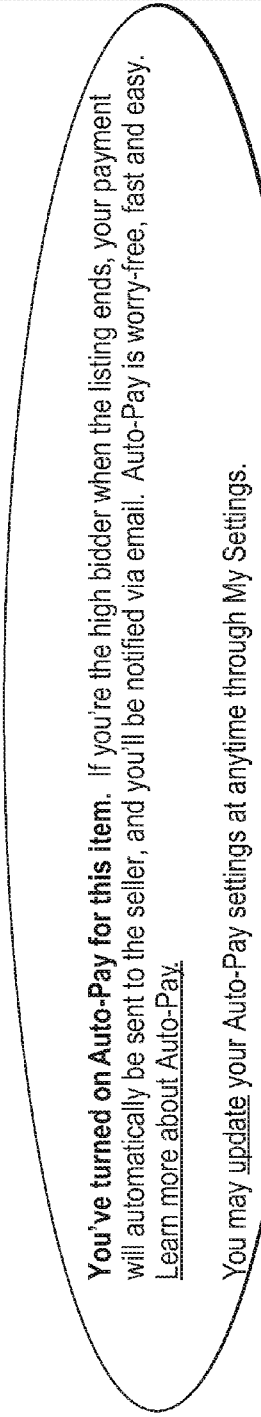
FIG. 12 illustrates a display showing confirmation that auto-pay is enabled by a buyer for a particular listing.

Item 1122334455 is also listed in FIG. 11. The auto-pay status column indicates that auto-pay is off. The buyer is losing the auction and can bid again, and offer a higher price than the current price. If the buyer re-submits a bid auto-pay can be turned on and a confirmation page can be displayed as shown in FIG. 12.

The listing for item 2107951143, indicates that the buyer has not enabled auto-pay. However, since the buyer is winning the auction, he/she can turn on auto-pay. By turning on auto-pay settings table 71 will be updated. Additionally, the buyer will be prompted to enter his/her shipping address and electronic payment service information.

The listing for item 2111518219 indicates that auto-pay is not available to the buyer. Auto-pay may be unavailable because the seller globally disabled auto-pay as discussed above in reference to decision block 710 of FIG. 10. Additionally, auto-pay may be unavailable because the seller disabled auto-pay for the specific listing.

Additionally, auto-pay can be used whenever the on-line auction closes, even when items are bought for a fixed price, through a buyout mechanism, such as "Buy it Now" used by eBay Inc. within the marketplace it operates. In this scenario a buyer can provide all his or her checkout information and then later decide to end the auction and purchase the item for a fixed-price. "Buy it Now" is also available as part of a fixed-price listing, where there is no auction element at all. The auto-pay module 44, completes the transaction using the previously entered checkout information.

Figure 13A:
FIG. 13A illustrates an exemplary graphical user interface of a listing having auto-pay available to the buyer.

FIGS. 13A-13D illustrate exemplary graphical user interfaces for initializing and using auto-pay. FIG. 13A illustrates an exemplary graphical user interface 1301 of a listing having auto-pay available to the buyer. GUI 1301 includes an auto-pay link 1302 which the buyer can click-on. By following auto-pay link 1302, the buyer can provide electronic payment system and shipping information needed to complete the marketplace transaction using auto-pay.

FIG. 13B illustrates an exemplary graphical user interface 1320 of a bid confirmation page. GUI 1320 is presented to a buyer when auto-pay is available for a listing, but has not yet been turned on by the buyer. GUI 1321 includes an auto-pay link 1321 which the buyer can click on to enable auto-pay. By following link 1321, the buyer can provide electronic payment system information and shipping information needed to complete the marketplace transaction using auto-pay.

FIG. 13C illustrates an exemplary graphical user interface 1350 to review a buyer's auto-pay shipping and payment information. GUI 1350 includes a submit button 1351, which when clicked enables auto-pay by the buyer for the particular listing. Payment block 1352 indicates the use of a credit card payment, however various embodiments are contemplated that utilize payment systems such as payment machine 8.

FIG. 13D illustrates an exemplary graphical user interface 13 that allow a buyer to view his/her auto-pay setting. GUI 1380 shows a buyer all listing that he/she is currently bidding on. Auto-pay setting link 1380, when selected by the buyer allows him/her to edit his/her auto-pay settings as stored in auto-pay settings table 71. The auto-pay settings may be edited on a GUI, such as GUI 1100 of FIG. 11.

FIG. 14 illustrates an exemplary graphical user interface 1400 for a seller enabling auto-pay. GUI 1400 includes for a payment address and additional information required to generate a listing on marketplace machine 10. Additionally, GUI 1401 includes an allowed auto-pay check box 1401 which the seller selects to allow buyers to complete transactions using auto-pay. If check box 1401 is not selected, decision block 720 of FIG. 10 results in the negative. Thus, various GUIs shown in FIGS. 13A-13D and FIG. 14 have been presented as one embodiment of initiating auto-pay.

In an additional embodiment, commerce system 100 can be used to enforce a seller driven auto-pay network-based transaction process. With seller driven auto-pay, the seller requires payment before the transaction can end successfully or after an item has been claimed. For example, before a listing for an auction item closes, payment is provided to the seller.

Figure 15:
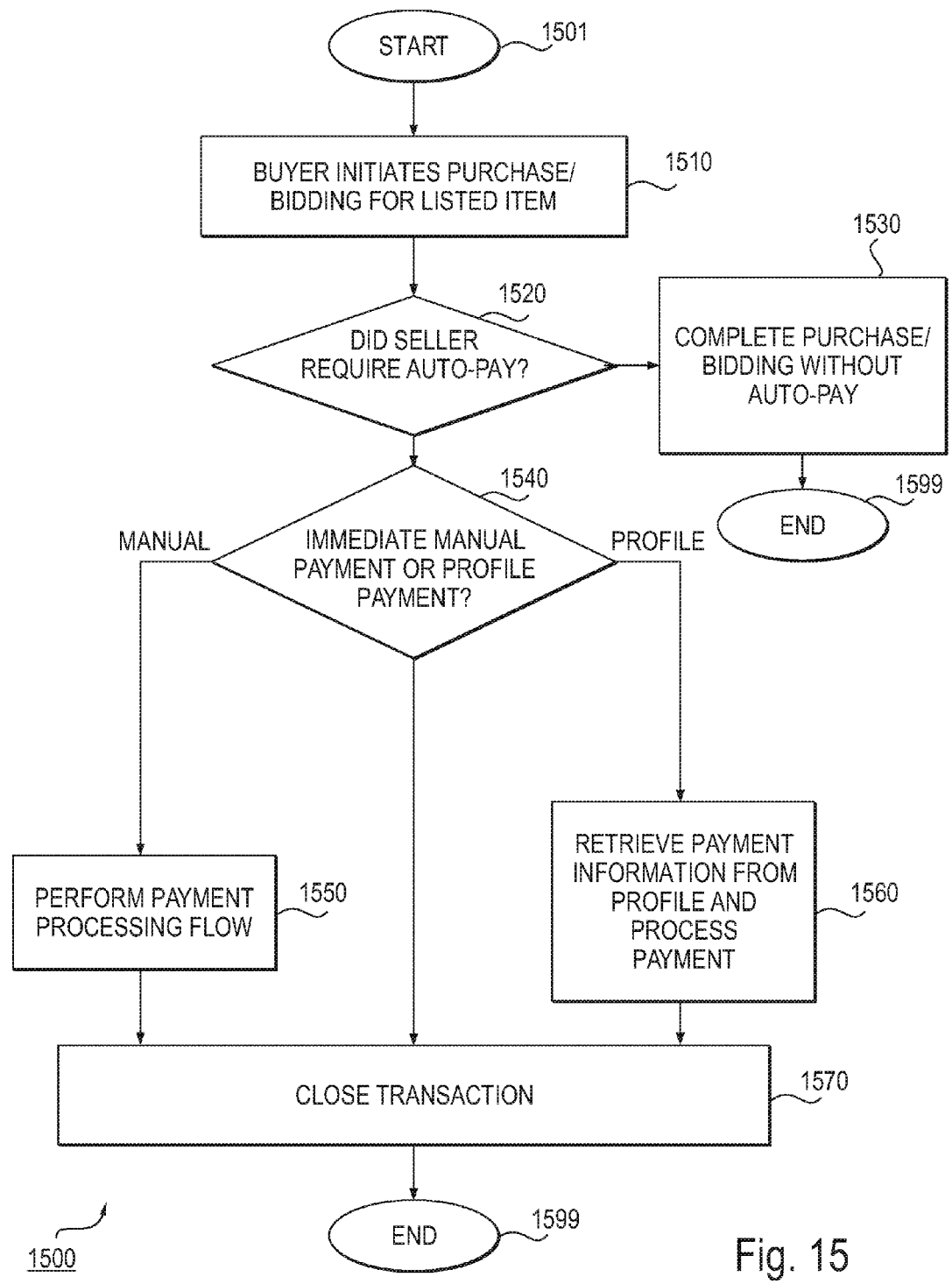
FIG. 15 illustrates a high-level flow chart illustrating a method according to an exemplary embodiment of the present invention, performed for seller-driven auto-pay.

A GUI similar to GUI 1100 can be presented to the seller for each listing he/she has. Such a GUI would also include an auto-pay status column that allows the seller to turn of auto-pay for each listing. For each listing, the seller can chose to require that the buyer pay in real time or have a stored payment profile (including credit cards) in order to successfully purchase or bid on a listing. FIG. 15 illustrates a high-level flow chart illustrating a method 1500, according to an exemplary embodiment of the present invention, performed for seller-driven auto-pay. The method 1500 commences at block 1501. At processing block 1510 a request from the buyer to initiate a purchase or bid associated with a network-based commerce transaction is received by auto-pay module 44. The network-based commerce transaction can be an auction having an immediate purchase item, a fixed price listing allowing immediate purchase by a private seller, or a fixed price listing allowing immediate purchase from an on-line retailer.

At decision block 1520, auto-pay module determines if the seller required the buyer use auto-pay for the particular listing. If auto-pay is not required, the buyer is prompted to complete the purchase, or enter a bid without invoking auto-pay at processing block 1530. The process would end at block 1599.

If the seller does require the buyer to use auto pay, auto-pay module 44 determines if the seller requires immediate manual payment or payment via information stored in the buyer's profile? If immediate manual payment processing is required, then at processing block 1550 the buyer is stepped through the process of paying with immediately available funds (e.g., account balance, instant funds transfer guaranteed by payment system, or credit card). The transaction is closed at processing block 1570 and the process terminates at block 1599.

If information stored in the buyer's profile is required for payment, such information is retrieved at processing block 1560. The information is used to process the payment (using payment system 8 if necessary). The transaction is closed at processing block 1570 and the process terminates at block 1599.

It is important to note that in this embodiment payment from the buyer to seller occurs before the auction closes. If a buyer can not make payment, then the auction remains open. In one embodiment of the payment processing flow of blocks 1550 and 1560, the item is not placed on hold, so it remains available to other prospective buyers. This allows for a "race" condition between two or more buyers. In an alternate embodiment, the listing is put on hold.

Payment processing flow of block 1550 and 1560 can involve numerous actions. For example, a bidder can be directed to payment system 8 to complete the transaction. Once payment system 8 collects and applies the buyer's payment information, confirms that the item is still available, it processes the payment and closes the listing. If multiple items are available, the quality available is decremented. Additionally, if the buyer is not previously registered with payment system 8, the buyer goes through the registration flow unique to payment system 8. It is important to note that payment processing information can be stored on marketplace machine 10 and provided to payment system 8, just prior to the conclusion of the transaction to streamline line the payment process. This can be achieved by querying the buyer to use his/her stored payment processing profile. Information in the profile can be stored in user table 54 and tables of database 30.

Marketplace machine 10 in conjunction with payment machine 8 cart have additional functionalities. These functionalities, as will be described in greater detail below include the use of confirmed shipping addresses, specific currency requirements, flexible payment timing, unpredictable final price payments, quick cash pricing options, and non-cash payment facilitation.

A confirmed shipping address can be an address that matches an address stored on file or verified with payment system 8. Additionally, an address can be confirmed based on a minimum buyer feedback/reputation score, a price range, or a seller chosen pre-approved buyer list.

The flexible timing functionality allows that at the seller's discretion, or based on the format, payment can occur after the close of item. For example, the seller can require that payment be made within 48 hours of the end of an item. This can happen in realtime, where the buyer enters payment information as described above. Alternatively, the seller can require that the buyer have a stored payment profile and an attempt to automatically process a payment can be made immediately, again in 24 hours in the event of a failure, and perhaps one last time 24 hours after that if a failure condition persists.

The unpredictable final price functionalities allows for cases where the final price cannot be known until the end of the listing (e.g., in an auction format, or a volume-discount multi-item purchase), the seller can apply different auto-pay rules. For example, if the final price exceeds $100, he or she can require immediate payment, but allow for a within-48-hours automatic payment if the price is less than $100.

The quick cash pricing option allows a seller to specify a start price (i.e., opening bid), an immediate purchase price (i.e., price at which the buyer can immediately purchase, resulting in the closing of the item), and a reserve price (i.e., price the buyer must meet or exceed before he or she can claim the item). Another pricing option is the Quick Cash price.

For example, the seller may list a PSA 10 Jason Giambi Alaska League rookie card with the following pricing options:
  start price: $9.99
  quick cash price: $200
  reserve price (non-quick-cash): $$300
  immediate purchase price: $500

The card can be sold in a variety of ways, including these two examples:
  Buyer 1: Wins via auction, with a winning bid of $400. The item closes and the buyer intends to pay with a cashier's check, to be sent to the seller in a few days. The buyer changes his mind the next day, though, leaving the seller with a non-paying bidder. Alternatively, the seller sends a second-chance offer to the net highest bidder, who sends him a cashier's check the next day for $390.
  Buyer 2: Agrees to a Quick Cash purchase, meaning that an auto-pay payment is made and the listing is ended when the buyer's payment of $200 is successfully processed.

Finally, system 100 allows for the processing of a non-cash payment (e.g., a trade). For example, just as payment system 8 maintains a payment profile for its customers, a baseball card storage facility maintains a portfolio of baseball cards for its customers (stored in a temperature-controlled vault, the ownership of these cards can be transferred without the cards ever leaving the vault). A seller can list an item "for sale for $3,000 immediate cash payment, or trade for ownership transfer of PSA 9 Mickey Mantle rookie card." Upon receiving notification that either $3,000 or the Mantle card had been deposited in his or her account, the seller would send the item to the buyer.

Figure 16:
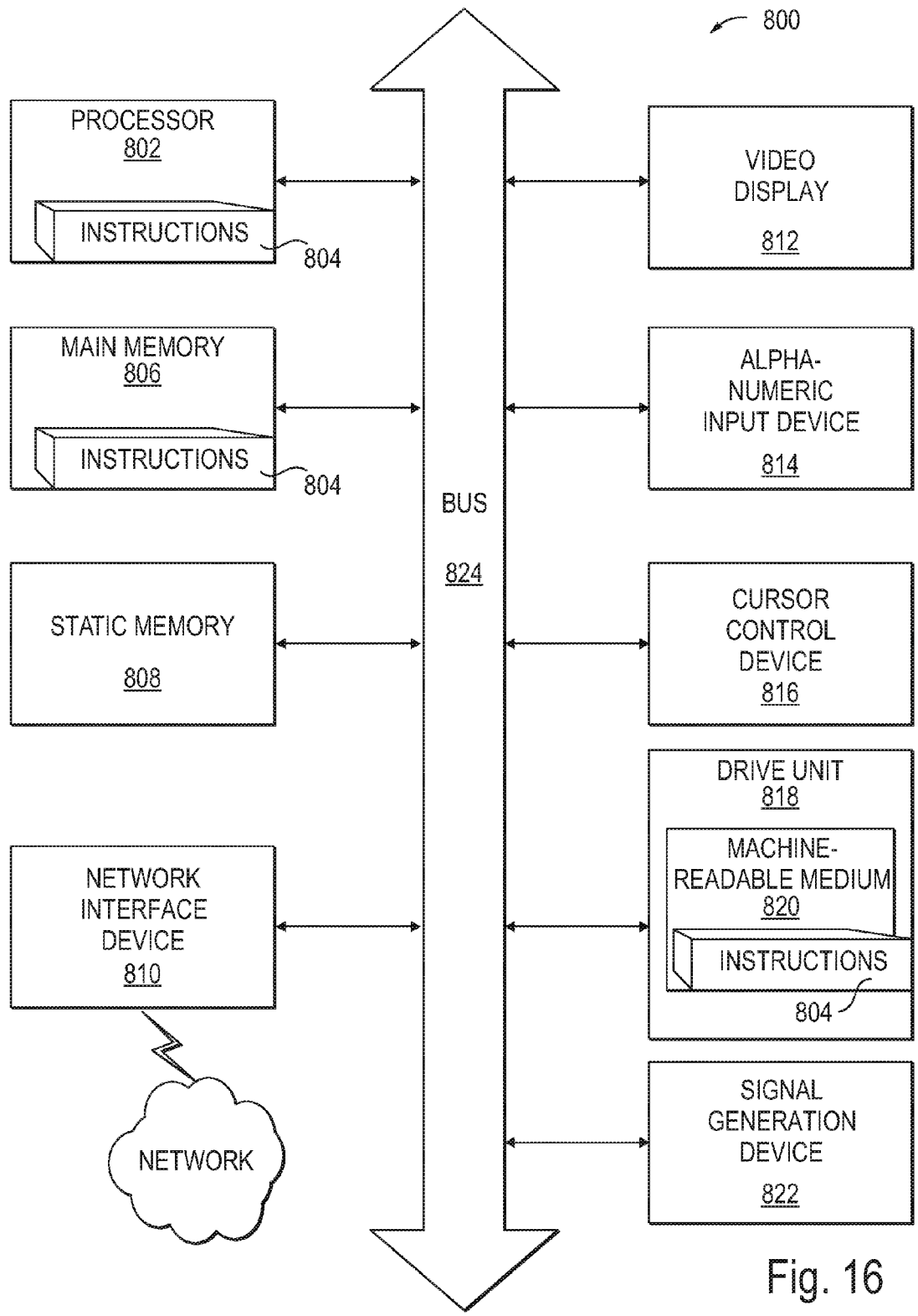
FIG. 16 shows a diagrammatic representation of a machine in the exemplary form of a computer system within which a set of instructions, for causing the machine to perform any one of the methodologies discussed above, may be executed.

FIG. 16 shows a diagrammatic representation of machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 800 includes a processor 802, a main memory 806 and a static memory 808, which communicate with each other via a bus 824. The computer system 800 may further include a video display unit 812 (e.g., a liquid crystal display (LCD) or a cathode ray tube (CRT)). The computer system 800 also includes an alphanumeric input device 814 (e.g., a keyboard), a cursor control device 816 (e.g., a mouse), a disk drive unit 818, a signal generation device 822 (e.g., a speaker) and a network interface device 810.

The disk drive unit 818 includes a machine-readable medium 820 on which is stored a set of instructions (i.e., software) 804 embodying any one, or all, of the methodologies described above. The software 804 is also shown to reside, completely or at least partially, within the main memory 806 and/or within the processor 802. The software 804 may further be transmitted or received via the network interface device 810. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, while the software is shown in FIG. 16 to reside within a single device, it will be appreciated that the software 804 could be distributed across multiple machines or storage media, which may include the machine-readable medium.

Thus, a method and system automate payment for a commerce transaction has been described. Although the present invention has been described with reference to specific exemplary embodiments, it will be evident that various modifications and changes may be made to these embodiments without departing from the broader spirit and scope of the invention. Accordingly, the specification and drawings are to be regarded an illustrative rather than a restrictive sense.

In the foregoing detailed description, the method and system of the present invention has been described with reference to specific exempla embodiments thereof. It will, however, be evident that various modifications and changes may be made thereto without departing from the broad spirit and scope of the present invention. In particular, the separate blocks of the various block diagrams represent functional blocks of methods or apparatuses and are not necessarily indicative of physical or logical separations or of an order of operation inherent in the spirit and scope of the present invention. The present specification and figures are accordingly to be regarded as illustrative rather than restrictive.

What is claimed is:

1. A method comprising:
    interfacing with a network-based commerce system configured to interact with a network-based payment system via a data network;
    receiving, at the network-based commerce system by use of a data processor, payment information related in part to a first electronic payment account associated with a first party, the first electronic payment account having been previously established at the network-based payment system, the payment information including information related to a second electronic payment account associated with a second party, the second electronic payment account having been previously established at the network-based payment system;
    receiving, at the network-based commerce system by use of the data processor, a request to complete a network-based commerce transaction upon occurrence of a termination event at the network-based commerce system, the termination event and a particular listing corresponding to the network-based commerce transaction;
    determining if the first party is registered with the network-based payment system;
    determining if the second party has disabled automatic payment for transactions corresponding to the particular listing while enabling automatic payment for transactions corresponding to different listings;
    determining if information provided by the first party can be confirmed based on a provided address; and
    automatically sending, by use of the data processor, the payment information to the network-based payment system in a data network communication upon the occurrence of the termination event, if the first party is registered with the network-based payment system, if the second party has enabled automatic payment for transactions corresponding to the particular listing, and if information provided by the first party can be confirmed based on a provided address, the sending of the payment information causing a transfer of funds at the network-based payment system from the first electronic payment account to the second electronic payment account.

2. The method of claim 1, further including enabling the first party to disable the automatic sending of the payment information, edit the payment information, and edit a shipping address.

3. The method of claim 1, wherein the network-based commerce transaction is one or more of a network-based auction, a fixed-price sale of an item from a private individual a fixed-price sale of an item from an network-based store, and an on-line barter transaction.

4. The method of claim 1, wherein the payment information is selected from a group including a credit card number, a checking account number, a shipping address and an e-mail address.

5. The method of claim 1, further comprising enabling the second party to disable the automatic sending of the payment information.

6. The method of claim 1, further comprising receiving the payment information prior to the termination event.

7. The method of claim 1, further comprising storing the payment information for future network-based commerce transactions.

8. The method of claim 1, further comprising providing the first party an option to always use the payment information for future network-based commerce transactions.

9. A system comprising:
    means for interfacing with network-based commerce system configured to interact with a network-based payment system via a data network;
    means for receiving, at the network-based commerce system by use of a data processor, payment information related in part to a first electronic payment account associated with a first party, the first electronic payment account having been previously established at the network-based payment system, the payment information including information related to a second electronic payment account associated with a second party, the second electronic payment account having been previously established at the network-based payment system;

means for receiving, at the network-based commerce system by use of the data processor, a request to complete a network-based commerce transaction upon occurence of a termination event at the network-based commerce system, the termination event and a particular listing corresponding to the network-based commerce transaction;

means for determining if the first party is registered with the network-based payment system;

means for determining if the second party has disabled automatic payment for transactions corresponding to the particular listing while enabling automatic payment for transactions corresponding to different listings;

means for determining if information provided by the first party can be confirmed based on a provided address; and means for automatically sending, by use of the data processor, the payment information to the network-based payment system in a data network communication upon the occurrence of the termination event, if the first party is registered with the network-based payment system, if the second party has enabled automatic payment for transactions corresponding to the particular listing, and if information provided by the first party can be confirmed based on a provided address, the sending of the payment information causing a transfer of funds at the network-based payment system from the first electronic payment account to the second electronic payment account.

10. The system of claim 9, being further configured to enable the first party to disable the automatic sending of the payment information, edit the payment information, and edit a shipping address.

11. The system of claim 9, wherein the network-based commerce transaction is one or more of a network-based auction, a fixed-price sale of an item from a private individual, a fixed-price sale of an item from an network-based store, and an on-line barter transaction.

12. The system of claim 9, wherein the payment information is selected from a group including a credit card number, a checking account number, a shipping address and an e-mail address.

13. The system of claim 9, further comprising means for enabling the second party to disable the automatic sending of the payment information.

14. The system of claim 9, further comprising means for receiving the payment information prior to the termination event.

15. The system of claim 9, further comprising means for saving the payment information for future network-based commerce transactions.

16. The system of claim 9, further comprising means for providing the first party an option to always use the payment information for future network-based commerce transactions.

17. A network-based system comprising:

a marketplace machine configured to receive data from a data network and to send data to the data network, the marketplace machine including:
  a data processor having access to the data network,
  a database engine server, and
  an automatic payment service module;
wherein the marketplace machine interfaces with a network-based commerce system configured to interact with a network-based payment system via the data network, the marketplace machine further to receive payment information related in part to a first electronic payment account associated with a first party, the first electronic payment account having been previously established at the network-based payment system, the payment information including information related to a second electronic payment account associated with a second party, the second electronic payment account having been previously established at the network-based payment system, the marketplace machine further to receive a request to complete a network-based commerce transaction upon occurrence of a termination event at the network-based commerce system, the termination event and a particular listing corresponding to the network-based commerce transaction, the marketplace machine further to determine if the first party is registered with the network-based payment system, determine if the second party has disabled automatic payment for transactions corresponding to the particular listing while enabling automatic payment for transactions corresponding to different listings, and determine if information provided by the first party can be confirmed based on a provided address, and the marketplace machine further to automatically send the payment information to the network-based payment system in a data network communication upon the occurrence of the termination event, if the first party is registered with the network-based payment system, if the second party has enabled automatic payment for transactions corresponding to the particular listing, and if information provided by the first party can be confirmed based on a provided address, the sending of the payment information causing a transfer of funds at the network-based payment system from the first electronic payment account to the second electronic payment account.

18. The network-based system of claim 17, being further configured to enable the first party to disable the automatic sending of the payment information, edit the payment information, and edit a shipping address.

19. The network-based system of claim 17, wherein the network-based commerce transaction is one or more of a network-based auction, a fixed-price sale of an item from a private individual, a fixed-price sale of an item from an network-based store, and an on-time barter transaction.

20. The network-based system of claim 17, wherein the payment information is selected from a group including a credit card number, a checking account number, a shipping address and an e-mail address.

21. The network-based system of claim 17, wherein the marketplace machine is configured to enable the second party to disable the automatic sending of the payment information.

22. The network-based system of claim 17, wherein the marketplace machine is configured to receive the payment information prior to the termination event.

23. The network-based system of claim 17, wherein the database engine server saves payment information for future network-based commerce transactions.

24. The network-based system of claim 17, wherein the marketplace machine provides the first party an option to always use the payment information for future network-based commerce transactions.

25. A non-transitory computer-readable storage medium for storing a sequence of instructions that, when executed by a machine, cause the machine to:
  interface with a network-based commerce system configured to interact with a network-based payment system via a data network;

receive, at the network-based commerce system, payment information related in part to a first electronic payment account associated with a first party, the first electronic payment account having been previously established at the network-based payment system, the payment information including information related to a second electronic payment account associated with a second party, the second electronic payment account having been previously established at the network-based payment system;

receive, at the network-based commerce system, a request to complete a network-based commerce transaction upon occurrence of a termination event at the network-based commerce system, the termination event and a particular listing corresponding to the network-based commerce transaction;

determine if the first party is registered with the network-based payment system;

determine if the second party has disabled automatic payment for transactions corresponding to the particular listing while enabling automatic payment for transactions corresponding to different listings;

determine if information provided by the first party can be confirmed based on a provided address; and automatically send the payment information to the network-based payment system in a data network communication upon the occurrence of the termination event, if the first party is registered with the network-based payment system, if the second party has enabled automatic payment for transactions corresponding to the particular listing, and if information provided by the first party can be confirmed based on a provided address, the sending of the payment information causing a transfer of funds at the network-based payment system from the first electronic payment account to the second electronic payment account.

26. The computer-readable storage medium of claim 25, wherein the sequence of instructions being further configured to cause the machine to enable the first party to disable the automatic sending of the payment information, edit the payment information, and edit a shipping address.

27. The computer-readable storage medium of claim 25, wherein the network-based commerce transaction is one or more of a network-based auction, a fixed-price sale of an item from a private individual, a fixed-price sale of an item from an network-based store, and an on-line barter transaction; and wherein the payment information is selected form a group including a credit card number, a checking account number, a shipping address and an e-mail address.

28. The computer-readable storage medium of claim 25, wherein the sequence of instructions being further configured to cause the machine to:
   enable the second party to disable the automatic sending of the payment information; and
   receive the payment information prior to the termination event.

29. The computer-readable storage medium of claim 25, wherein the sequence of instructions being further configured to cause the machine to:
   save the payment information for future network-based commerce transactions; and
   provide the first party an option to always use the payment information for future network-based commerce transactions.

* * * * *

UNITED STATES PATENT AND TRADEMARK OFFICE
CERTIFICATE OF CORRECTION

PATENT NO. : 8,364,556 B2  
APPLICATION NO. : 13/411006  
DATED : January 29, 2013  
INVENTOR(S) : Nguyen et al.

Page 1 of 6

It is certified that error appears in the above-identified patent and that said Letters Patent is hereby corrected as shown below:

On the Title page, in column 2, under "Other Publications", line 4, delete "html>." and insert --html>,--, therefor Title page 2, in column 2, under "Other Publications", line 5, delete "Filed" and insert --filed--, therefor Title page 2, in column 2, under "Other Publications", line 12, delete "Sep." and insert --Jan.--, therefor Title page 2, in column 2, under "Other Publications", line 17, delete "10/427,553" and insert --10/427,553,--, therefor Title page 2, in column 2, under "Other Publications", line 23, before "Auction", insert --"--, therefor Title page 2, in column 2, under "Other Publications", line 23, after "Welcome!", insert --",--, therefor Title page 2, in column 2, under "Other Publications", line 38, delete "asp," and insert --asp>,--, therefor Title page 2, in column 2, under "Other Publications", line 39, delete "[Online]," and insert --[Online].--, therefor Title page 2, in column 2, under "Other Publications", line 43, delete "Works;" and insert --Works:--, therefor Title page 3, in column 1, under "Other Publications", line 29, delete "/wmv." and insert --//www.--, therefor Signed and Sealed this  
Sixth Day of August, 2013

Teresa Stanek Rea  
*Acting Director of the United States Patent and Trademark Office*

Title page 3, in column 1, under "Other Publications", line 30, delete ",00 .html" and insert --,00.html--, therefor Title page 3, in column 1, under "Other Publications", line 44, delete "website1d" and insert --website/d--, therefor Title page 3, in column 1, under "Other Publications", line 57, delete "[Online]," and insert --[Online].--, therefor Title page 3, in column 2, under "Other Publications", line 6, delete "http:/" and insert --http://--, therefor Title page 3, in column 2, under "Other Publications", line 17, delete "Information"." and insert --Information",--, therefor Title page 3, in column 2, under "Other Publications", line 47, delete "Agreement"." and insert --Agreement",--, therefor Title page 3, in column 2, under "Other Publications", line 57, delete "pgs" and insert --pg--, therefor Title page 3, in column 2, under "Other Publications", line 61, delete "Internet;" and insert --Internet:--, therefor Title page 3, in column 2, under "Other Publications", line 63, delete "asp," and insert --asp>,--, therefor Title page 3, in column 2, under "Other Publications", line 68, after "Examination", insert --Search--, therefor Title page 3, in column 2, under "Other Publications", line 71, before "mailed", delete "date", therefor Title page 4, in column 1, under "Other Publications", line 1, delete "Faq;" and insert --Faq--, therefor Title page 4, in column 1, under "Other Publications", line 6, delete "fusearction×fee" and insert --fuseaction=fee--, therefor Title page 4, in column 1, under "Other Publications", line 17, delete "http:" and insert --http://--, therefor Title page 4, in column 1, under "Other Publications", line 21, delete "niphox" and insert --niphix--, therefor Title page 4, in column 1, under "Other Publications", line 24, delete "comihandbook" and insert --com/handbook--, therefor CERTIFICATE OF CORRECTION (continued)
U.S. Pat. No. 8,364,556 B2

Title page 4, in column 2, under "Other Publications", line 5, delete "Holiday." and insert --Holiday--, therefor Title page 4, in column 2, under "Other Publications", line 6, after "[Online]", insert --.--, therefor Title page 4, in column 2, under "Other Publications", line 7, delete "bilipoint" and insert --billpoint--, therefor Title page 4, in column 2, under "Other Publications", line 30, delete "news_." and insert --news_--, therefor Title page 4, in column 2, under "Other Publications", line 41, delete "htm>,'" and insert --htm>,--, therefor Title page 5, in column 1, under "Other Publications", line 37, delete "[Online]," and insert --[Online].--, therefor Title page 5, in column 2, under "Other Publications", line 5, delete "helpitos." and insert --help/tos.--, therefor Title page 5, in column 2, under "Other Publications", line 17, delete "comlintweek" and insert --com/intweek--, therefor Title page 5, in column 2, under "Other Publications", line 30-31, delete "profilesiamazon" and insert --profiles/amazon--, therefor Title page 5, in column 2, under "Other Publications", line 36, delete "Yahoo!0" and insert --Yahoo!--, therefor Title page 5, in column 2, under "Other Publications", line 49, delete "B," and insert --B.,--, therefor Title page 5, in column 2, under "Other Publications", line 52, delete "Kevin." and insert --Kevin,--, therefor Title page 5, in column 2, under "Other Publications", line 59, delete "trade"." and insert --trade",--, therefor Title page 5, in column 2, under "Other Publications", line 72, delete "CBS_." and insert --CBS_--, therefor Title page 5, in column 2, under "Other Publications", line 72, delete "htm >" and insert --htm>--, therefor

CERTIFICATE OF CORRECTION (continued)
U.S. Pat. No. 8,364,556 B2

In the Drawings:

Sheet 1 of 19, Fig. 1, reference numeral 12, line 1, delete "PAGES" and insert --PAGE--, therefor On sheet 2 of 19, Fig. 4, line 4, after "FUNCTIONS", insert --72--, therefor On sheet 13 of 19, Fig 13A, reference numeral 1302, line 2, after "Electronic", delete "of", therefor On sheet 16 of 19, Fig. 13D, delete "for" and insert --from--, therefor On sheet 17 of 19, FIG. 17, reference numeral 1400, line 2, delete "desplay" and insert --display--, therefor In the Specifications:

In column 2, line 7, after "based", insert --commerce system--, therefor

In column 2, line 55, after "pay", insert --.--, therefor

In column 3, line 29, delete "partner" and insert --payment--, therefor

In column 3, line 31, delete "12" and insert --38--, therefor

In column 3, line 32, delete "22" and insert --34--, therefor

In column 3, line 51, delete "16" and insert --8--, therefor

In column 3, line 54, delete "16" and insert --8--, therefor

In column 4, line 5, delete "Calif.)" and insert --Calif.).--, therefor

In column 4, line 9, after "Corporation", insert --)--, therefor

In column 4, line 49, delete "168" and insert --8--, therefor

In column 5, line 28, delete "pendancy" and insert --pendency--, therefor

In column 5, line 60, after "user", delete "10", therefor

In column 6, line 2, delete "Hock" and insert --block--, therefor

In column 6, line 18, after "buyer", insert --is--, therefor

CERTIFICATE OF CORRECTION (continued)
U.S. Pat. No. 8,364,556 B2

In column 6, line 27, delete "flare" and insert --are--, therefor

In column 6, line 50, delete "and" and insert --and/or--, therefor

In column 6, line 56, delete "tend" and insert --and--, therefor

In column 6, line 63, delete "exemplary," and insert --exemplary--, therefor

In column 7, line 40, delete "600" and insert --700--, therefor

In column 7, line 42, after "is", insert --on--, therefor

In column 8, line 50, delete "13" and insert --1375--, therefor

In column 8, line 51, delete "1380" and insert --1375--, therefor

In column 8, line 60, delete "1401" and insert --1400--, therefor

In column 9, line 7, delete "of" and insert --off/on--, therefor

In column 9, line 29, delete "auto pay" and insert --auto-pay--, therefor

In column 9, line 44, delete "embodiment" and insert --embodiment,--, therefor

In column 9, line 63, after "streamline", delete "line", therefor

In column 10, line 2, delete "cart" and insert --can--, therefor

In column 10, line 41, delete "$$300" and insert --$300--, therefor

In column 11, line 31, delete "included" and insert --include--, therefor

In column 11, line 45, after "regarded", insert --in--, therefor

In column 11, line 48, delete "exempla" and insert --exemplary--, therefor

In column 11, line 50, delete "broad" and insert --broader--, therefor

In the Claims:

In column 12, line 38, in Claim 3, after "individual", insert --,--, therefor

In column 12, line 39, in Claim 3, delete "an" and insert --a--, therefor (second occurrence)

CERTIFICATE OF CORRECTION (continued)
U.S. Pat. No. 8,364,556 B2

In column 13, line 5, in Claim 9, delete "occurence" and insert --occurrence--, therefor In column 13, line 38, in Claim 11, delete "an" and insert --a--, therefor (second occurrence)

In column 14, line 43, in Claim 19, delete "an" and insert --a--, therefor (second occurrence)

In column 14, line 44, in Claim 19, delete "on-time" and insert --on-line--, therefor In column 16, line 12, in Claim 27, delete "an" and insert --a--, therefor In column 16, line 14, in Claim 27, delete "form" and insert --from--, therefor